United States Patent
King et al.

(10) Patent No.: US 9,856,129 B2
(45) Date of Patent: *Jan. 2, 2018

(54) METHOD AND APPARATUS FOR AUTOMATICALLY MONITORING FUEL TANK ULLAGE IN AN AUTOMATED FUEL AUTHORIZATION PROGRAM

(71) Applicant: ZONAR SYSTEMS, INC., Seattle, WA (US)

(72) Inventors: Michael Charles King, Kent, WA (US); Rick Fadler, Newcastle, WA (US); Charles Michael McQuade, Issaquah, WA (US)

(73) Assignee: Zonar Systems, Inc., Seattle, WA (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/206,697

(22) Filed: Mar. 12, 2014

(65) Prior Publication Data

US 2014/0195047 A1    Jul. 10, 2014

Related U.S. Application Data

(63) Continuation-in-part of application No. 12/906,615, filed on Oct. 18, 2010, now abandoned.
(Continued)

(51) Int. Cl.
*H04B 1/3822* (2015.01)
*B67D 7/30* (2010.01)
(Continued)

(52) U.S. Cl.
CPC .............. *B67D 7/302* (2013.01); *G06F 21/44* (2013.01); *H04L 9/3215* (2013.01);
(Continued)

(58) Field of Classification Search
CPC ........ G07F 11/002; G07F 13/00; G07F 13/04; G07F 13/06; G07F 15/00
(Continued)

(56) References Cited

U.S. PATENT DOCUMENTS 4,263,945 A    4/1981 Van Ness
4,469,149 A    9/1984 Walkey et al.
(Continued)

OTHER PUBLICATIONS

Press Release TCH—Transportation Clearing House (published online on Oct. 16, 2010 at https://www.tch.com/zconpress.html).*

*Primary Examiner* — James Detweiler

(57) ABSTRACT

Described herein is a fuel authorization program that vehicles enrolled in the fuel authorization program to provide fuel tank sensor data in each fuel authorization request, so that an amount of fuel authorized will be limited to the amount needed to fill the vehicle's fuel tank, reducing a likelihood that fuel will be diverted. In at least some embodiments, the fuel authorization controller at the vehicle automatically uses the fuel tank sensor data and known tank size to include in a fuel authorization request sent to a fuel vendor data defining how much fuel is required to fill the vehicle fuel tanks. In at least some embodiments, the fuel vendor consults data from a source other than the vehicle (such as records maintained by the fuel authorization program) to determine how large the vehicles fuel tanks are, and to calculate how much fuel is required.

14 Claims, 10 Drawing Sheets

Related U.S. Application Data

(60) Provisional application No. 61/800,125, filed on Mar. 15, 2013, provisional application No. 61/792,838, filed on Mar. 15, 2013, provisional application No. 61/801,670, filed on Mar. 15, 2013.

(51) Int. Cl.
*H04L 9/32* (2006.01)
*H04L 29/06* (2006.01)
*G06F 21/44* (2013.01)

(52) U.S. Cl.
CPC .......... *H04L 9/3226* (2013.01); *H04L 63/107* (2013.01); *G06F 2221/2111* (2013.01); *H04L 2209/805* (2013.01); *H04L 2209/84* (2013.01)

(58) Field of Classification Search
USPC ............................................................. 705/8
See application file for complete search history.

(56) References Cited

U.S. PATENT DOCUMENTS

| | | |
|---|---|---|
| 4,658,371 A | 4/1987 | Walsh et al. |
| 4,846,233 A | 7/1989 | Fockens |
| 4,934,419 A | 6/1990 | Lamont et al. |
| 5,072,380 A | 12/1991 | Randelman et al. |
| 5,072,615 A * | 12/1991 | Nawrocki ........... G01F 23/0076 33/366.14 |
| 5,204,819 A | 4/1993 | Ryan |
| 5,359,522 A | 10/1994 | Ryan |
| 5,440,109 A | 8/1995 | Hering et al. |
| 5,596,501 A | 1/1997 | Comer et al. |
| 5,890,520 A | 4/1999 | Johnson, Jr. |
| 5,913,180 A | 6/1999 | Ryan |
| 5,923,572 A | 7/1999 | Pollock |
| 5,956,259 A | 9/1999 | Hartsell, Jr. et al. |
| 6,024,142 A | 2/2000 | Bates |
| 6,070,156 A | 5/2000 | Hartsell, Jr. |
| 6,085,805 A | 7/2000 | Bates |
| 6,128,551 A | 10/2000 | Davis et al. |
| 6,169,938 B1 | 1/2001 | Hartsell, Jr. |
| 6,616,036 B2 | 9/2003 | Streicher et al. |
| 6,899,151 B1 | 5/2005 | Latka et al. |
| 7,155,199 B2 | 12/2006 | Zalewski |
| 7,604,169 B2 | 10/2009 | Demere |
| 7,640,185 B1 | 12/2009 | Giordano et al. |
| 2001/0034565 A1 | 10/2001 | Leatherman |
| 2005/0010797 A1 | 1/2005 | Rushworth |
| 2005/0018853 A1 | 1/2005 | Lain et al. |
| 2008/0203146 A1* | 8/2008 | Betancourt ........... G06Q 20/20 235/375 |
| 2008/0295569 A1* | 12/2008 | Lundstrom ............ G01F 23/32 73/1.73 |
| 2009/0048945 A1 | 2/2009 | DeLine |
| 2009/0255195 A1 | 10/2009 | Bridgman |
| 2010/0088127 A1* | 4/2010 | Betancourt ........... G06Q 10/02 705/5 |
| 2010/0191674 A1 | 7/2010 | Condon |
| 2010/0198491 A1 | 8/2010 | Mays |
| 2011/0035049 A1 | 2/2011 | Barrett |
| 2011/0071777 A1* | 3/2011 | Duan ...................... G01D 3/02 702/55 |
| 2011/0196600 A1* | 8/2011 | Henderson ............. G01C 22/00 701/123 |
| 2011/0239664 A1* | 10/2011 | Sanders ............. G01F 23/2962 62/56 |
| 2012/0095920 A1 | 4/2012 | McQuade |
| 2012/0176499 A1 | 7/2012 | Winter |
| 2012/0223829 A1 | 9/2012 | Tyler |
| 2012/0303531 A1 | 11/2012 | Betancourt et al. |
| 2013/0013431 A1* | 1/2013 | Fansler ................. G07F 13/025 705/18 |
| 2014/0263629 A1 | 9/2014 | McQuade et al. |

* cited by examiner

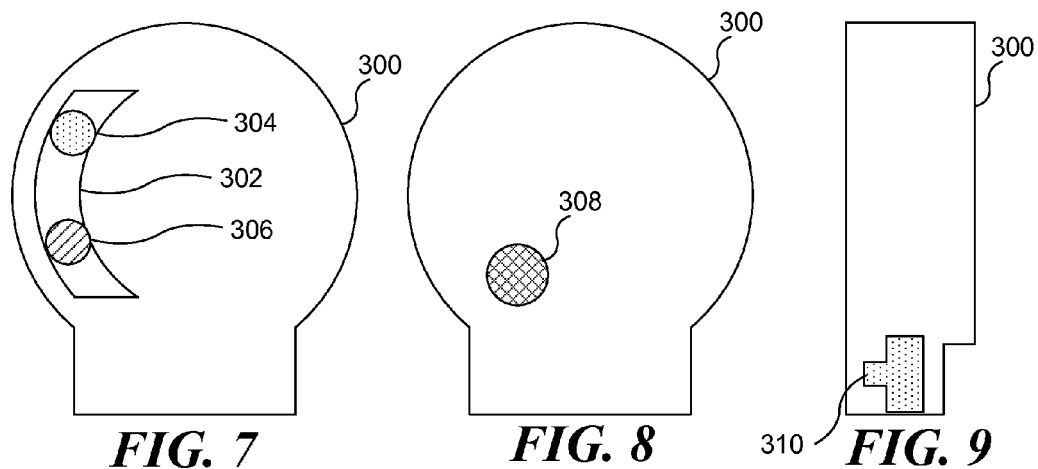
FIG. 7   FIG. 8   FIG. 9
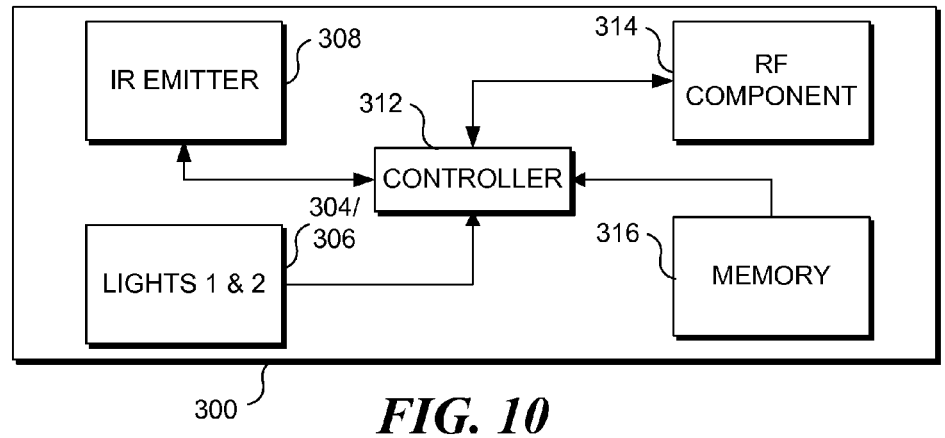
FIG. 10
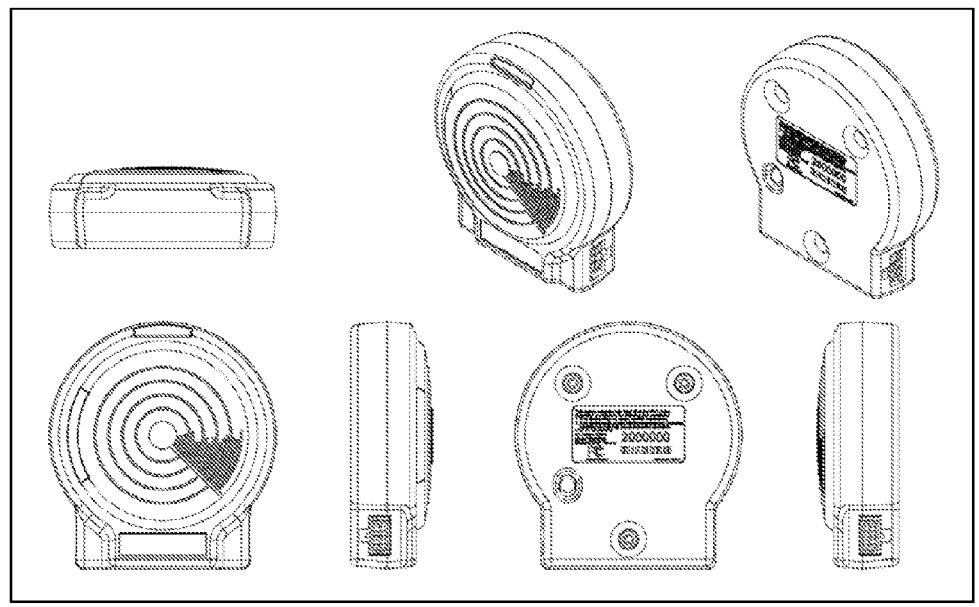
FIG. 11

METHOD AND APPARATUS FOR AUTOMATICALLY MONITORING FUEL TANK ULLAGE IN AN AUTOMATED FUEL AUTHORIZATION PROGRAM

RELATED APPLICATIONS

This application is based on three prior provisional applications; Ser. No. 61/800,125, filed on Mar. 15, 2013, 61/792, 838, filed on Mar. 15, 2013, and Ser. No. 61/801,670, also filed on Mar. 15, 2013, the benefits of the filing dates of which are hereby claimed under 35 U.S.C. §119(e). This application is also a continuation-in-part of prior co-pending application Ser. No. 12/906,615, filed on Oct. 18, 2010, the benefit of the filing date of which is hereby claimed under 35 U.S.C. §120.

BACKGROUND

The trucking industry has an ongoing problem with fuel theft. Trucking companies normally issue fuel cards to drivers. The drivers purchase fuel for company trucks at national refueling chains (i.e., truck stops).

A large problem is that owner operators also frequent such refueling stations. Company drivers often make deals with owner operators to allow the owner operators use of a company fuel card for a cash payment. For example, the owner operator will give the company driver $50 in cash to purchase $150 of fuel on the company fuel card, saving the owner operator $100 in fuel costs. This type of fraud is very difficult for the fleet operators to detect and prevent, because the amount of diverted fuel may be sufficiently small relative to the miles that the fleet vehicle is driven by the driver so as to be difficult to notice, even when fuel use patterns of the vehicle are analyzed.

It would therefore be desirable to provide a more secure method and apparatus for implementing fuel authorization in the trucking industry that actually prevents owner operators from stealing fuel charged to a fleet operator account. Knowing the actual amount of fuel required in a vehicle before authorizing a fuel transaction will further help reduce diversion of fuel.

SUMMARY

The concepts disclosed herein encompass a plurality of components that can be used in a fuel authorization program, in which vehicles enrolled in the fuel authorization program can automatically be approved to receive fuel if their credentials are valid.

One aspect of the concepts disclosed herein is a fuel authorization program that requires data to be dynamically retrieved from a vehicle data bus during the fuel authorization process. Requiring some of the data need for successful fuel authorization to be dynamically retrieved from a vehicle data bus, rather than solely relying on data stored in a relatively portable fuel authorization component assigned to an enrolled vehicle eliminates any spoofing of the system by moving the fuel authorization component from an enrolled vehicle to a non-enrolled vehicle.

Another aspect of the concepts disclosed herein is a fuel authorization program that requires the enrolled vehicles and fuel vendors to communicate with each via both IR and RF data links. The use of an IR data link (a relatively short range, highly directional data link) between an enrolled vehicle and a fuel island/fuel pump unambiguously defines to the fuel vendor which fuel pump needs to be enabled.

Still another aspect of the concepts disclosed herein relates to equipping vehicles enrolled in a fuel authorization program with a fuel tank sensor to monitor the ullage (i.e., the empty space) in a fuel tank. The readings from the fuel tank sensor can be used in a number of different ways. In at least some embodiments, the fuel authorization controller at the vehicle automatically uses the fuel tank sensor data and known tank size to include in a fuel authorization request sent to a fuel vendor data defining how much fuel is required to fill the vehicle fuel tanks. In at least some embodiments, the fuel vendor consults data from a source other than the vehicle (such as records maintained by the fuel authorization program) to determine how large the vehicles fuel tanks are, and to calculate how much fuel is required.

In a first exemplary embodiment, based on the fuel authorization programs described herein requiring both IR and RF data links between the vehicle and the fuel vendor, such fuel tank sensor readings are automatically sent to the fuel vendor from the enrolled vehicle, along with fuel authorizations credentials. The fuel vendor, after determining if the credentials are valid, will only authorize dispensing the amount of fuel required to fill the fuel tank at the enrolled vehicle based on the fuel tank sensor data provided by the vehicle.

In a second exemplary embodiment, based on the fuel authorization programs described herein requiring fuel authorizations credentials to be dynamically retrieved from a vehicle data bus (such that fuel authorization components cannot simply be moved to a non-enrolled vehicle to enable fuel authorization at the non-enrolled vehicle), such fuel tank sensor readings are automatically sent to the fuel vendor from the enrolled vehicle, along with dynamically retrieved fuel authorizations credentials. The fuel vendor, after determining if the credentials are valid, will only authorize dispensing the amount of fuel required to fill the fuel tank at the enrolled vehicle based on the fuel tank sensor data provided by the vehicle.

In a third exemplary embodiment, once the fuel vendor has verified the credentials and authorized dispensing of a specific amount of fuel based on the fuel tank sensor data sent by the enrolled vehicle in a fuel authorization request, the fuel vendor determines if the fuel pump being used automatically shut off (to avoid spillage) before the authorized amount of fuel was dispensed. If so, the fuel vendor automatically sends a message to the enrolled vehicle indicating that the fuel tanks sensor data was incorrect, and a fuel authorization processor at the enrolled vehicle automatically applies a calibration factor to the fuel tank sensor, so future fuel tank sensor data used in subsequent fuel authorization requests is more accurate.

In a fourth exemplary embodiment, once the fuel vendor has finished dispensing the amount of fuel authorized based on the fuel tank sensor data sent by the enrolled vehicle in a fuel authorization request, the fuel authorization processor at the enrolled vehicle automatically takes another fuel tank sensor reading. If the fuel tank sensor reading indicated that the fuel tank is not full, the fuel authorization processor at the enrolled vehicle automatically applies a calibration factor to the fuel tank sensor, so future fuel tank sensor data used in subsequent fuel authorization requests is more accurate.

In a fifth exemplary embodiment, vehicles enrolled in the fuel authorization program automatically periodically send fuel tank sensor data over a long range wireless data link to a remote monitoring service (i.e., the fuel tank sensor data is not just provided to a fuel vendor during a fuel transaction, but much more frequently, as part of normal vehicle operation). Participating fuel vendors automatically send details regarding each authorized fuel transaction to the monitoring service. The monitoring service automatically analyzes the fuel tank sensor data from enrolled vehicles and fuel transaction data for those enrolled vehicles, and determines if the fuel tank sensor in a particular vehicle needs to be calibrated. If so, the monitoring service communicates that to the fuel authorization processor at the enrolled vehicle, which automatically applies a calibration factor to the fuel tank sensor, so future fuel tank sensor data used in subsequent fuel authorization requests is more accurate.

It should be understood that the fuel tank sensor data can also be incorporated into other fuel authorization paradigms, including those employing proximity sensors and video cameras.

The functions noted above are preferably implemented by at least one processor (such as a computing device implementing machine instructions to implement the specific functions noted above) or a custom circuit (such as an application specific integrated circuit).

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a logic diagram showing exemplary method steps implemented in a second exemplary embodiment for implementing a fuel authorization method;

FIG. 2 schematically illustrates vehicle components and fuel island components used to implement the method steps of FIG. 1;

FIG. 7 is a front elevation of an exemplary device (referred to herein as a truck board device and/or puck) implementing the RF and IR components that can be used in a vehicle enrolled in a fuel authorization program generally corresponding to the method of FIG. 1, enabling alignment lights to be seen;

FIG. 8 is a rear elevation of the truck board device of FIG. 7, enabling an IR transmitter to be seen;

FIG. 9 is a side elevation of the truck board device of FIG. 7, enabling a hard wire data link port to be seen;

FIG. 10 is a functional block diagram showing some of the basic functional components used in the truck board device of FIG. 7;

Figure 1:
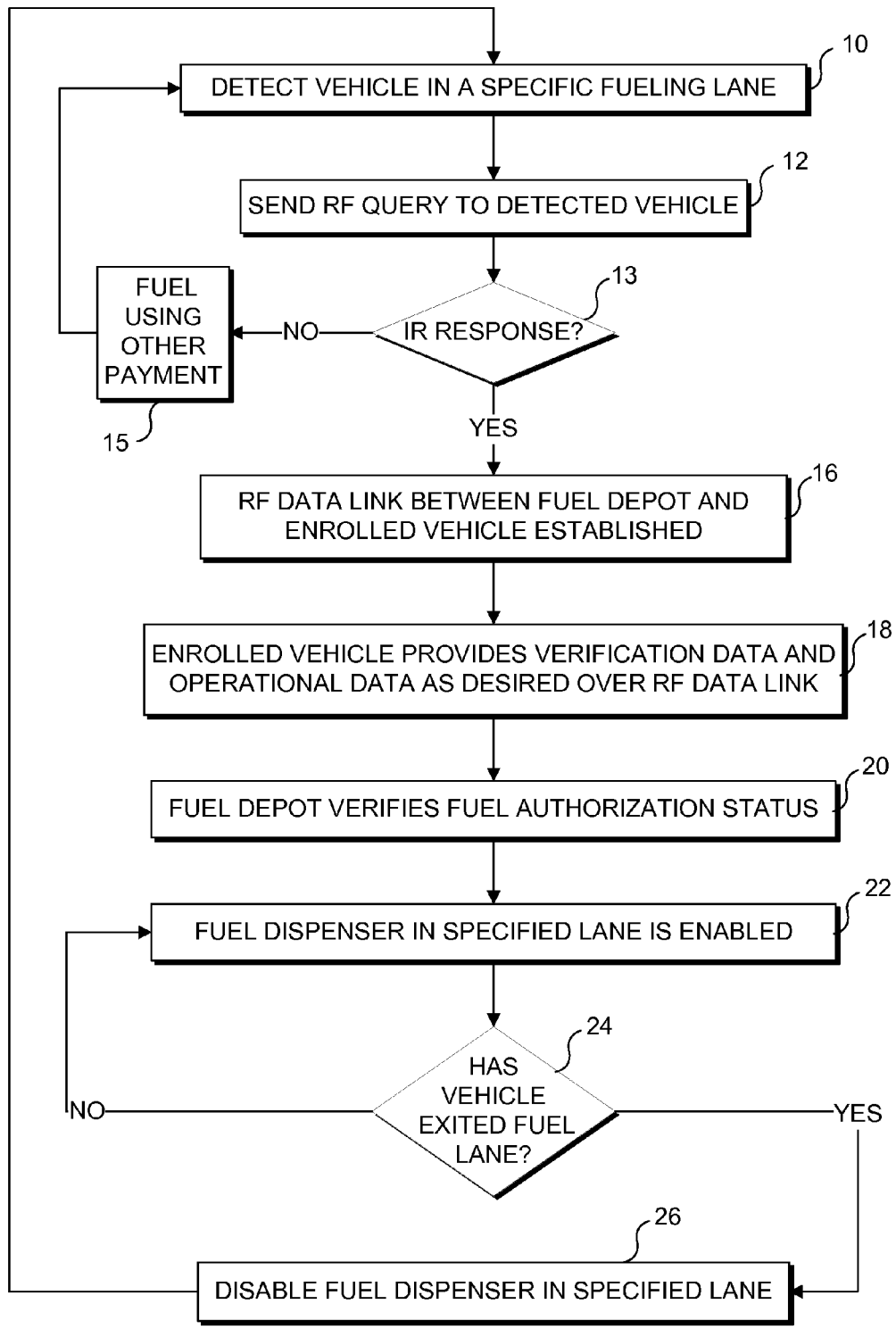
Figure 12:
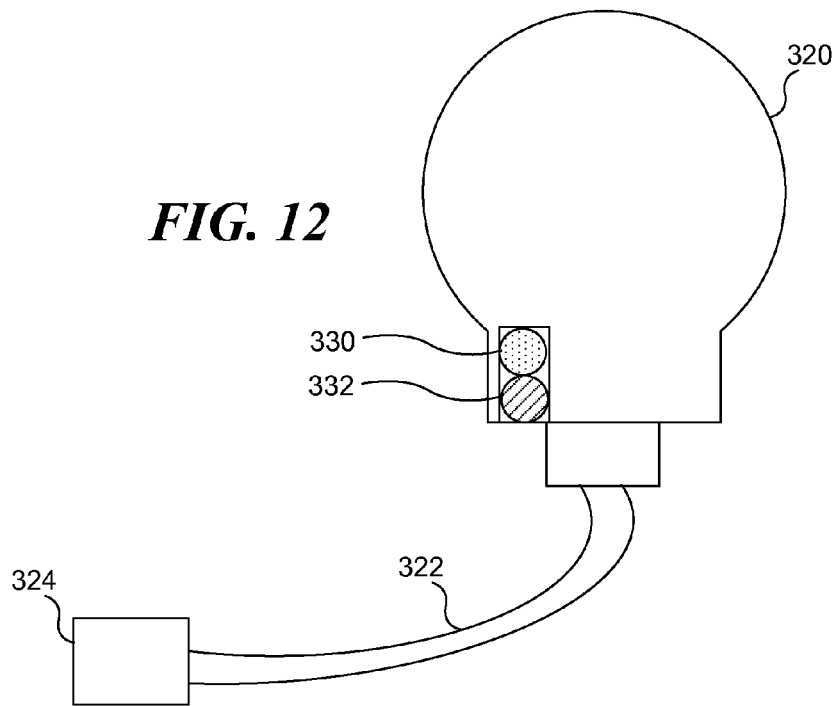
Figure 13:
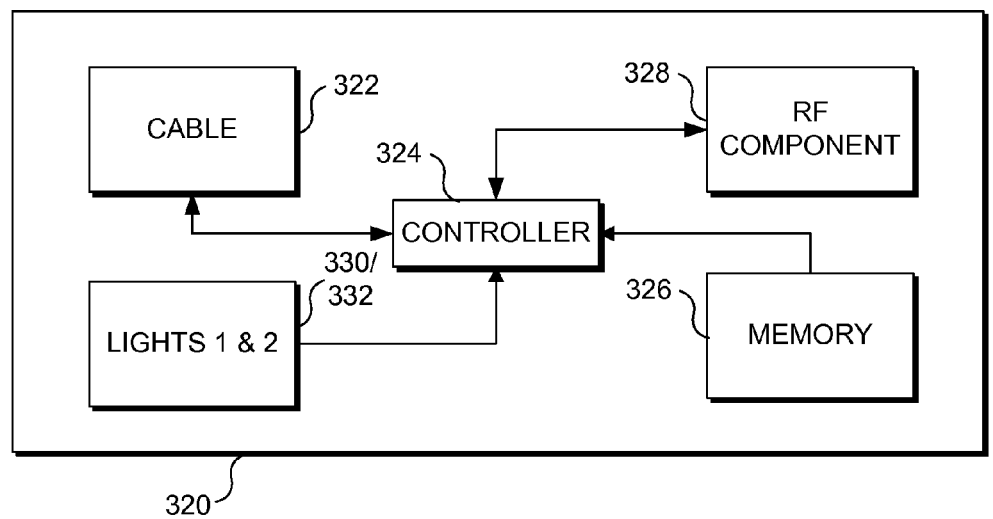
Figure 14:
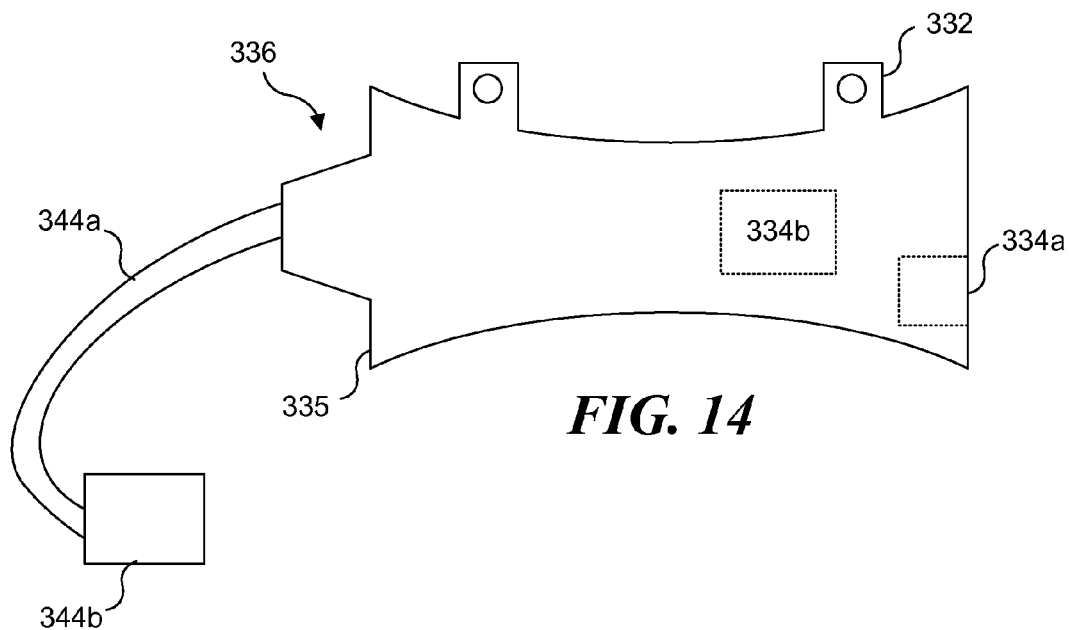
Figure 15:
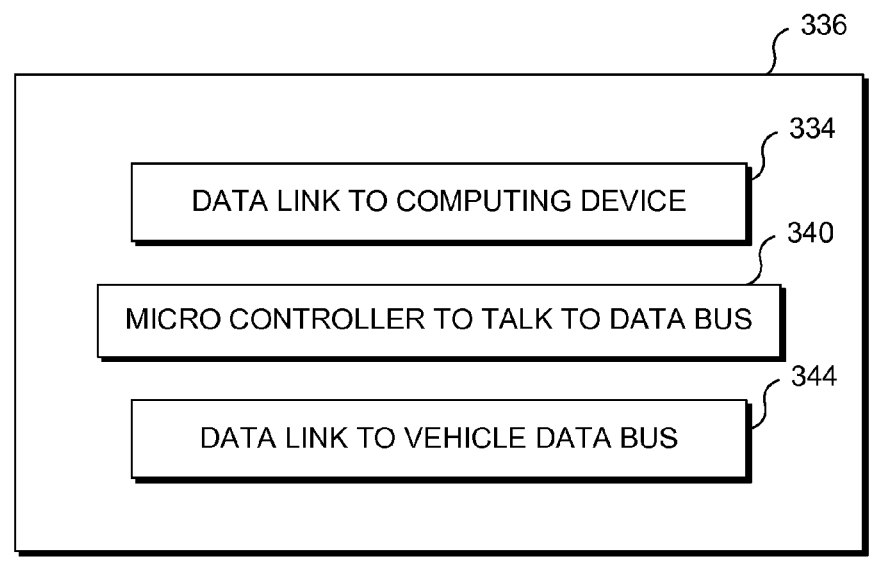
Figure 16:
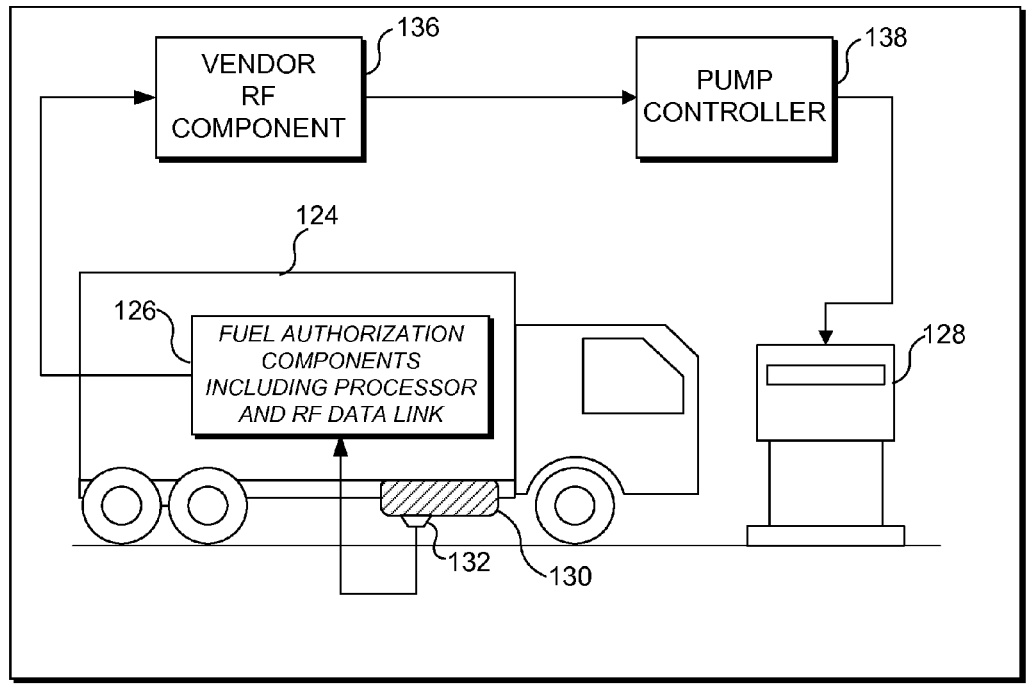
Figure 17:
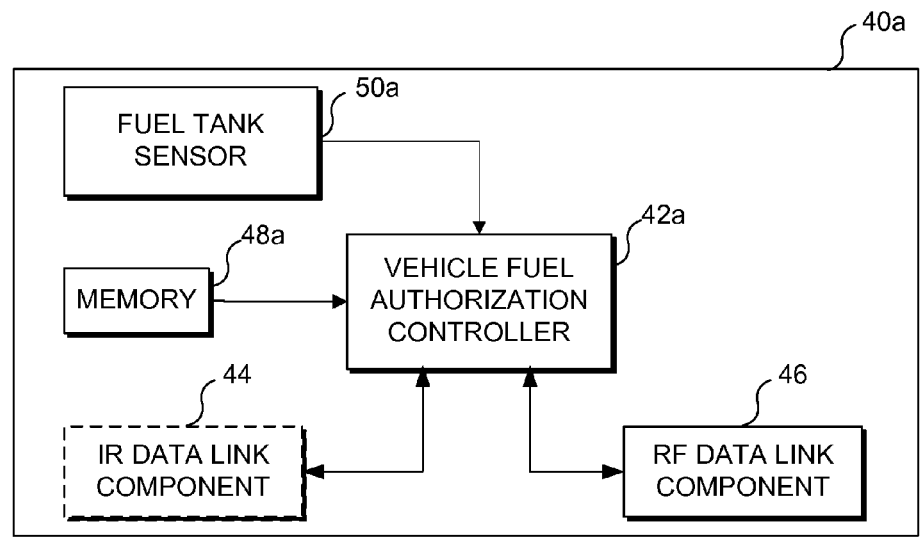
Figure 18:
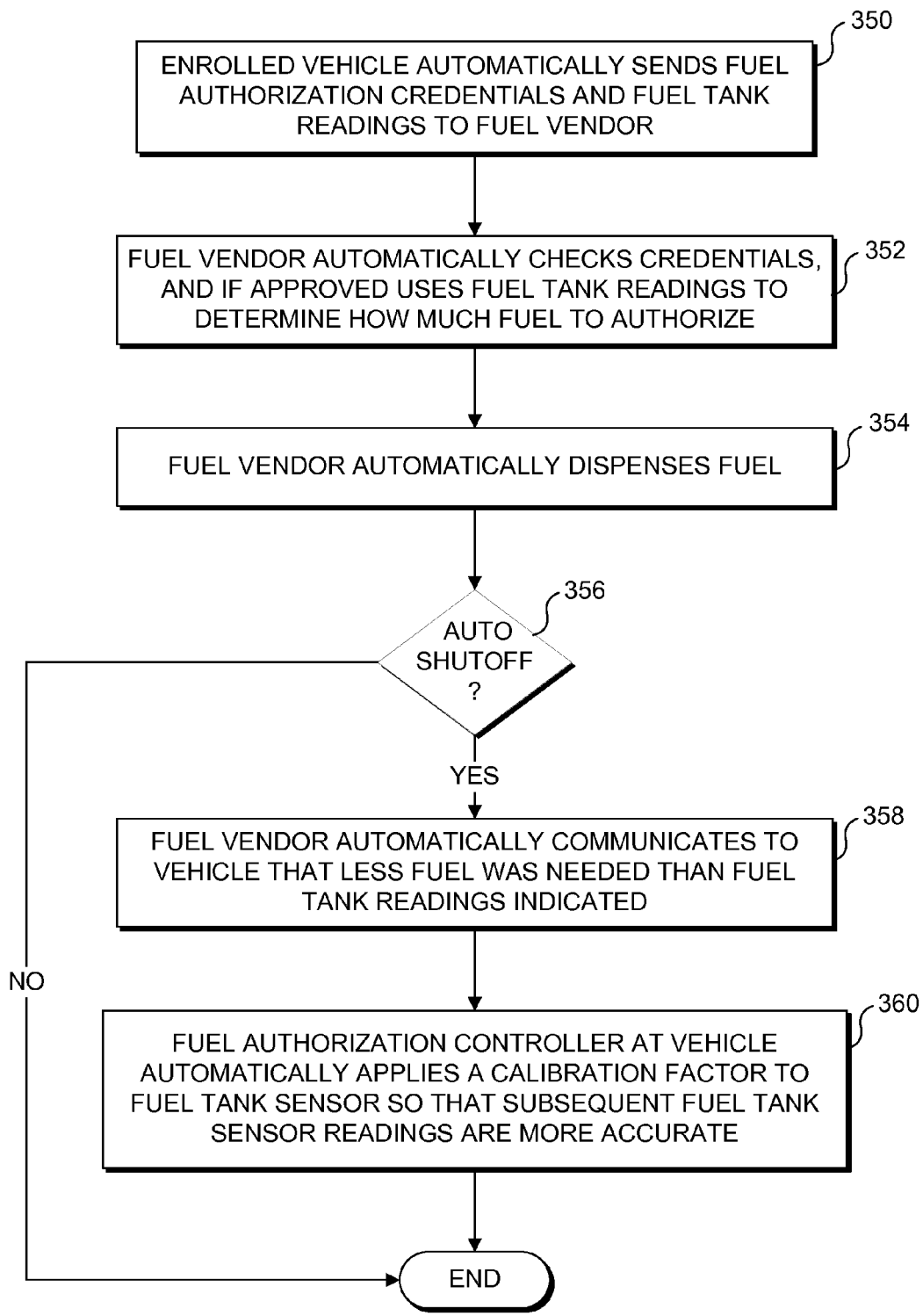
Figure 19:
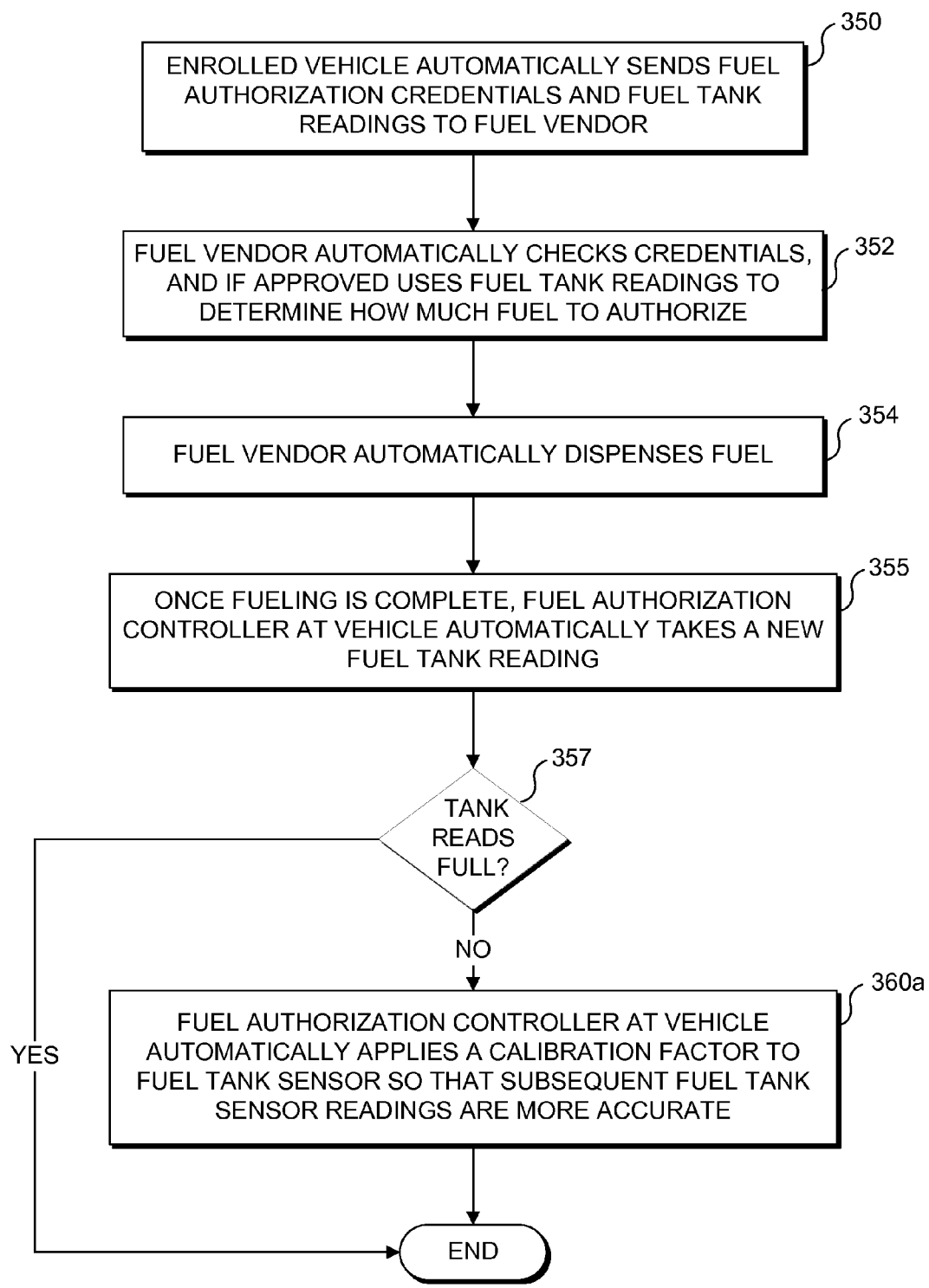
Figure 20:
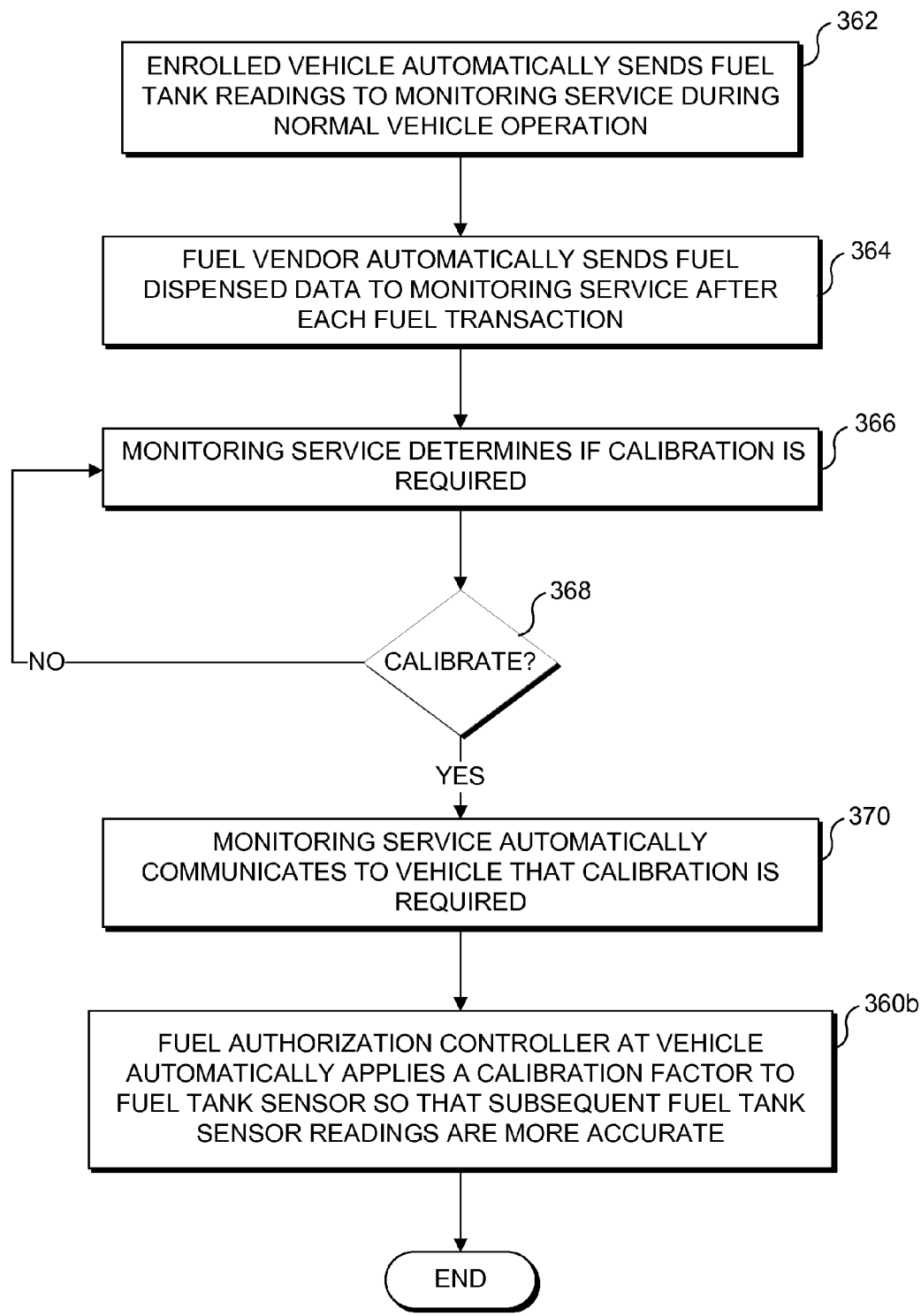

FIG. 11 includes a plurality of plan views of a commercial implementation of the truck board device of FIG. 7;

FIG. 12 is a front elevation of an exemplary device (referred to herein as a reefer tag) that can be used in connection with the truck board device of FIG. 7 to either authorize fuel delivery to a refrigerated trailer pulled by a vehicle enrolled in a fuel authorization program generally corresponding to the method of FIG. 1, or to facilitate automated collected of fuel use data from a refrigerated trailer;

FIG. 13 is a functional block diagram showing some of the basic functional components used in the reefer tag of FIG. 12;

FIG. 14 is a rear elevation of an exemplary device (referred to herein as a J-bus cable or smart cable) that can be used to acquire vehicle data from a vehicle data bus, and convey that data to a mobile computing device, which in at least some embodiments is employed in a fuel authorization program;

FIG. 15 is a functional block diagram showing some of the basic functional components used in the J-bus cable/smart cable of FIG. 14;

FIG. 16 schematically illustrates vehicle components and fuel vendor components used to implement a fuel authorization program requiring fuel tank readings from enrolled vehicles for fuel authorization;

FIG. 17 is an exemplary functional block diagram showing the basic functional components required at an enrolled vehicle to implement a fuel authorization program requiring fuel tank readings from enrolled vehicles for fuel authorization;

FIG. 18 is a logic diagram showing exemplary method steps implemented in a fuel authorization program requiring fuel tank readings from enrolled vehicles for fuel authorization, where the fuel vendor determines if the fuel tank sensor in an enrolled vehicle requires calibration;

FIG. 19 is a logic diagram showing exemplary method steps implemented in a fuel authorization program requiring fuel tank readings from enrolled vehicles for fuel authorization, where a fuel authorization controller at the vehicle determines if the fuel tank sensor in the vehicle requires calibration; and FIG. 20 is a logic diagram showing exemplary method steps implemented in a fuel authorization program requiring fuel tank readings from enrolled vehicles for fuel authorization, where a monitoring service collects fuel tank sensor data from enrolled vehicles and fuel transaction data from fuel vendors to determine if the fuel tank sensor in an enrolled vehicle requires calibration.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated. As used herein, the term "about" means±10% of an indicated value.

A fuel authorization system utilizing both IR and RF data links was originally disclosed in commonly owned patent titled METHOD AND APPARATUS FOR FUEL ISLAND AUTHORIZATION FOR THE TRUCKING INDUSTRY, Ser. No. 12/906,615, the disclosure and drawings of which are hereby specifically incorporated by reference. The sections labeled New Subject Matter provide details on hardware and methods related to fuel authorization systems, and represent subject matter not included in the above noted patent application. The reference to new subject matter should not be construed to indicate that such subject matter was added after the filing of a pre-AIA provisional application to which this application claims priority.

Exemplary Fuel Authorization System Utilizing IR and RF Data Links

Various aspects of the concepts disclosed herein related to a fuel authorization system utilizing both IR and RF data links, to ensure that fuel is authorized only at a fuel pump the enrolled vehicle is immediately adjacent to (i.e., to reduce the chance that fuel will be delivered to a non-enrolled vehicle at an adjacent fuel pump). A high level overview of such a system is provided below.

The concepts disclosed herein are directed to a method to enable an operator of vehicle refueling stations to automatically authorize the refueling of a specific vehicle, such that once the authorization is provided, the fuel being dispensed cannot easily be diverted to a different vehicle. In an exemplary embodiment, multiple wireless communication links are established between the fuel island and the vehicle, to ensure that the vehicle authorized to receive the fuel is actually at the fuel island, and not merely close by. In this exemplary embodiment, when the fuel island sensor detects that a vehicle has entered the refuel lane, a radiofrequency (RF) transmitter proximate the fuel island pings (i.e., transmits a query to) the vehicle indicating that the sensor detected the vehicle entering the fuel island. If the vehicle is enrolled in the fuel authorization program, the vehicle will have an RF receiver and transmitter that can communicate with the RF receiver/transmitter associated with the fuel island. It is recognized that an RF transmission, even if at relatively low power and short range, is likely to carry over a wider range than simply the distance between a vehicle in a refuel lane and a fuel dispenser serving that fuel lane. Accordingly, an additional wireless data link is established using infrared (IR) transmitters and receivers, which are more directional than RF communication (and when low power light emitting diodes are used as an IR source, the IR transmission can have a short range). Thus, in response to an RF query from the fuel island, the enrolled vehicle will initially respond by directing an IR-based communication toward the fuel island. The IR receiver associated with each refuel lane is positioned such that the IR receiver will only be able to receive an IR signal from an IR transmitter actually positioned in that specific refuel lane, verifying that the enrolled vehicle responding to the fuel island's RF query is really the vehicle in the refuel lane for which the RF query originated. Once the location of the enrolled vehicle is confirmed, RF communication between the fuel island (or the fuel vendor operating the fuel island, in embodiments where the RF component is not located on the fuel island) is enabled, and the enrolled vehicle provides identification data to the fuel island. The vehicle's identification data are unique to that specific vehicle.

In other exemplary embodiments, the vehicle detection sensor is eliminated, and the RF data link between the fuel vendor and the enrolled vehicle is initiated after an IR data link between the fuel island and the vehicle is established. Where the vehicle includes an appropriately configured telematics unit, the telematics unit can be used to collect data showing the vehicle has not moved away from the fuel island, and that data can be conveyed in real-time to the fuel vendor (in this case, the fuel dispenser, once enabled, remains enabled until the real-time data transfer showing the vehicle has not moved relative to the fuel island ceases, or such data indicates that the vehicle has moved away from the fuel island).

FIG. 1 is a logic diagram showing exemplary method steps implemented in a second exemplary embodiment for implementing a fuel authorization method in accord with the concepts disclosed herein. In a block 10, a vehicle is detected moving into an empty fuel lane (i.e., a vehicle is detected moving adjacent to a specific fuel pump or fuel dispenser, wherein the phrase "moving adjacent to" should be understood to mean moving the vehicle into a position appropriate to enable the vehicle to be refueled, understanding that some slight repositioning maybe required to accommodate specific fuel tank positions). In a block 12, an RF query is generated to interrogate the detected vehicle. In a decision block 13, it is determined whether the detected vehicle has properly responded to the RF query by transmitting an IR response to an IR receiver disposed proximate the fuel dispenser. In at least some embodiments, components are added to enrolled vehicles to help drivers determine if a vehicle is properly positioned to enable the IR transmission required for fuel delivery authorization. Referring once again to decision block 13, if no IR response has been received, the vehicle is either not enrolled or is improperly positioned, and fueling will not be enabled unless some other form of payment is made, as indicated in a block 15. If an appropriate IR response is received in decision block 13, then in a block 16, an RF data link between the fuel vendor and the detected vehicle is established, to facilitate further verification, as well as to enable the vehicle to convey operational and any additional data as desired. In a block 18, the vehicle uses the RF data link to convey verification data to the fuel vendor, along with any additional data desired. In a block 20, the fuel vendor verifies that the vehicle is authorized to participate in the fuel authorization program. Once the authorization is approved, the fuel dispenser to which the vehicle is adjacent is enabled in a block 22, and the enrolled vehicle can be refueled.

After the fuel dispenser has been enabled, the sensor in the fuel lane is monitored to determine if the enrolled vehicle has moved out of the fuel lane, as indicated in decision a block 24. If no motion (or no more than a predefined amount of motion consistent with adjusting the vehicle's position relative to the fuel dispenser to enable the fuel dispenser to better reach the authorized vehicle's fuel tanks) is detected, then the logic loops back to block 22, and the fuel dispenser remains enabled. If excessive motion (more than the predefined amount of motion consistent with adjusting the vehicle's position relative to the fuel dispenser to enable the fuel dispenser nozzle to more efficiently reach the authorized vehicle's fuel tanks) is detected, then in a block 26, the fuel dispenser is disabled. The process is repeated when another vehicle is detected entering the fuel lane.

Significantly, the method of FIG. 1 requires that the response from the vehicle to the RF query is an IR-based response. In contrast to using an RF data link to respond to the initial RF query, the use of an IR data link (which is directional in addition to short range) provides an additional level of assurance to the participants of the fuel authorization program that there will be no confusion as to which fuel dispenser is to be enabled for a specific participating vehicle (since a plurality of enrolled vehicles may be refueling at the same fueling vendor location at about the same time). It is believed that this additional insurance will lead to such an embodiment having greater potential acceptance in the market, by easing potential user fears that fuel authorizations will be misapplied.

Note that when an IR receiver at a particular fuel dispenser receives an IR transmission from an enrolled vehicle, the fuel vendor unambiguously knows which fuel dispenser should be enabled (if additional verification checks are successful). The IR transmission does not need to include any data at all, as receipt of the IR signal itself identifies the fuel dispenser that should be subsequently enabled. However, in many embodiments, some actual data will be conveyed over the IR data link. In at least some embodiments, the IR response from the vehicle will uniquely identify a specific vehicle. In an exemplary, but not limiting embodiment, the IR transmission includes the vehicle's VIN, sent in an unencrypted form. In other embodiments, the IR transmission includes a random string and a time variable. In this embodiment, to increase the speed of data transfer (recognizing that IR data transfer is not particularly fast), the initial RF query from the pump includes a random alphanumeric string of less than 17 digits (VINs generally being 17 digits, so the random string will be shorter, resulting in faster IR data transfer as compared to embodiments in which the IR response from the vehicle was based on transmitting the vehicle's VIN over the IR data link in response to the RF query from the fuel vendor). The vehicle will then reply to the fuel vendor's RF query by transmitting the less than 17 character random string via IR. The fuel island will only accept an IR return of the random string for a limited period of time (to prevent another party from eavesdropping and obtaining the random string, and attempting to use the random string themselves). The period of time can vary, with shorter time periods making it more difficult for another party to use the random string. In an exemplary but not limiting embodiment, the time period is less than five minutes, and in at least one embodiment is less than about 90 seconds, which should be sufficient for an enrolled vehicle to properly position itself relative to the IR receiver. In at least some embodiments, the IR data will include at least one data component that is obtained from a memory in the vehicle that is not readily removable, such that simply removing the IR transmitter from an enrolled vehicle and moving the IR transmitter to a non-authorized vehicle will not enable the non-authorized vehicle to receive fuel.

Certain of the method steps described above can be implemented automatically. It should therefore be understood that the concepts disclosed herein can also be implemented by a controller, and by an automated system for implementing the steps of the method discussed above. In such a system, the basic elements include an enrolled vehicle having components required to facilitate the authorization process, and a fuel vendor whose fuel lanes/fuel dispensers include components that are required to facilitate the authorization process as discussed above. It should be recognized that these basic elements can be combined in many different configurations to achieve the exemplary concepts discussed above. Thus, the details provided herein are intended to be exemplary, and not limiting on the scope of the concepts disclosed herein.

Figure 2:
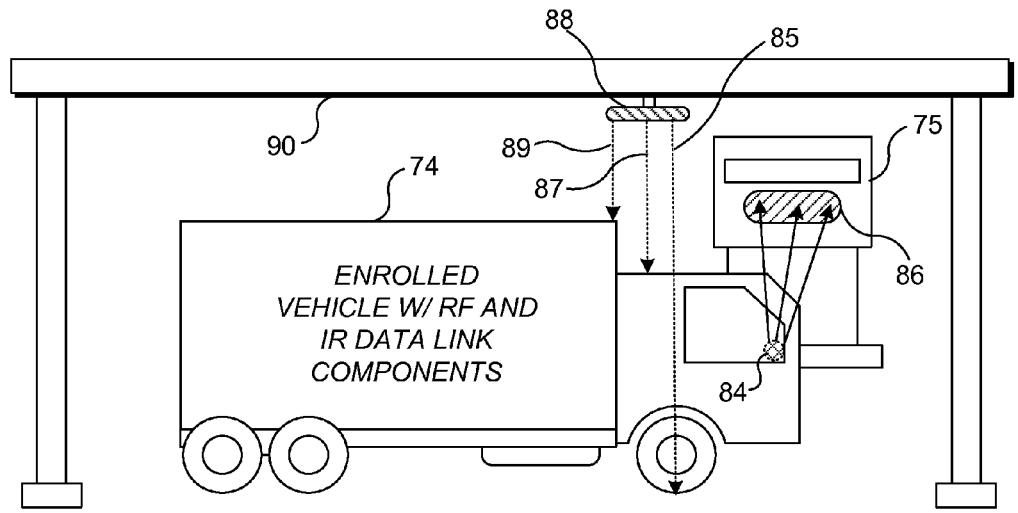

FIG. 2 schematically illustrates vehicle components and fuel island components used to implement the method steps of FIG. 1. A fuel island participating in the fuel authorization program may include a canopy 90 (or other support) to which a motion detector 88 is coupled, as well as a fuel pump 75 (the fuel dispenser) upon which an IR receiver 86 is disposed. Not specifically shown are the RF component and the processor. It should be recognized that the canopy is not required, and the motion sensor could be disposed in a different location, so long as vehicle motion proximate the fuel dispenser can be detected. As enrolled vehicle 74 enters the fuel lane, motion detector 88 detects the vehicle. The RF query is initiated as discussed above, and an IR transmitter 84 on the vehicle conveys IR data to IR receiver 86 (note that transmitter 84 and receiver 86 are generally aligned when the cab of the vehicle is aligned with the fuel dispenser). As shown in FIG. 2, the IR receiver is located on the fuel pump. It should be recognized that such a location is exemplary, and not limiting. In at least one additional exemplary embodiment, where the fuel island includes a canopy, the IR receiver is attached to the canopy. In a particularly preferred, but not limiting embodiment, each fuel authorization element disposed at the fuel island is contained in a common housing attached to the canopy (in at least one exemplary embodiment, this common housing contains the motion sensor, the IR receiver, the RF component, and the fuel island processor). Note that in embodiments in which the IR receiver is mounted on the canopy, the IR transmitter in the vehicle can direct the IR beam upwardly through the windshield of the vehicle. This configuration minimizes IR signal noise, as ambient light (such as reflected sunlight) is less likely to be received by the IR receiver. With respect to facilitating an alignment between the IR transmitter and the IR receiver, various techniques, including the lights discussed above, can be used to help the driver make sure the IR receiver and IR transmitter are aligned. In one embodiment, paint stripes in the fuel island can provide visual references to the driver, so the driver can ensure that the IR receiver and IR transmitter are aligned. As noted above, in at least one exemplary embodiment, the IR transmitter is placed proximate to the windshield of the vehicle so the IR beam can pass through the windshield glass. If the fuel island includes a dedicated RF component and processor, those elements can be placed in many different alternative locations on the fuel island. As noted above, in at least one exemplary embodiment, such elements are placed in a common housing, along with motion detector 88.

Some types of motion detectors function by sending out an ultrasonic pulse, and receiving a reflected pulse, to determine a distance between the sensor and the reflective surface. In FIG. 1, a distance 85 represents a distance that will be detected by the sensor when no vehicle is present and the signal from the sensor is being reflected by the ground under the canopy. A distance 87 represents a distance that will be detected by the sensor when a vehicle is present and the signal from the sensor is being reflected by the cab of the vehicle. A distance 89 represents a distance that will be detected by the sensor when a vehicle is present and the signal from the sensor is being reflected by a cargo storage area of the vehicle, where that portion of the vehicle is relatively taller than the cab. The sensor will generally be able to distinguish between distances 85, 87, and 89. In various embodiments, the fuel island processor can use data from the motion sensor to control the fuel authorization process. In one exemplary embodiment, the fuel island controller is configured to ignore fuel authorization requests if the motion sensor reports a distance that does not meet a predefined minimum (this would prevent fuel authorizations for smaller vehicles, such as cars, that might have been equipped with components to attempt to spoof the fuel authorization system). In another exemplary embodiment, the fuel island controller is configured to keep the pump enabled so long as the motion sensor reports a distance that ranges between a predefined minimum and a predefined maximum, which generally correspond with the dimensions of vehicles enrolled in the fuel authorization program (such as commercial trucks, including but not limited to tractor/trailer combinations). This enables drivers to move their vehicle relative to the fuel island after the IR data link has been established, to make sure the vehicle's fuel tanks are properly positioned relative to the fuel dispenser (which may not always be the case when the IR receiver and transmitter are aligned, depending on the relative position of the vehicle's fuel tanks).

In another exemplary embodiment, the vehicle is a tractor trailer combination, and the tractor has a first fuel tank generally located proximate the cab of the tractor, and the trailer has a second fuel tank generally located proximate the rear or midpoint of the trailer, and the tractor and the trailer have different heights. The second fuel tank is for fuel used by a refrigeration unit for the trailer. Significantly, fuel used in the first fuel tank for the tractor is taxed at a different rate than fuel used by the trailer for refrigeration. The fuel island processor can be configured to use data from the motion sensor to determine whether the vehicle is positioned to receive fuel in the first or second fuel tank, so that the fueling data collected by the fuel vendor can account for the tax differential. In at least one embodiment, the fuel island processor is configured to assume that fuel delivered initially is received by the first fuel tank (i.e., fuel for the tractor), and that if the motion sensor detects a change in distances (i.e., such as the difference between distances 87 and 89), that subsequently delivered fuel (i.e., fuel delivered after the height/distance change) is fuel for the refrigeration unit. In an exemplary embodiment, distance 85 is generally about 200 inches, and the fuel island controller is configured to assume that any reading between about 174 inches and about 200 inches indicates that the fuel lane is empty. Reefers (refrigerated trailers) generally are about 162 inches or taller. Non-refrigerated trailers and tractor cabs are generally less than about 162 inches in height. Based on those distances, in a related exemplary embodiment the fuel island controller (or a non-local controller analyzing data from the range finder/motion sensor at the fuel island) is configured to assume that when distance 89 ranges from about 0 to less than about 38 inches, that a reefer trailer is underneath the sensor (the sensor is 200 inches from the ground, and a reefer trailer is greater than about 162 inches in height). Similarly, the fuel island controller is configured to assume that when distance 89 (or distance 87) ranges from about 39 inches to about 173 inches a non-reefer trailer or cab (or some other type of vehicle) is underneath the sensor. Thus, the processor can be configured to determine when a reefer trailer is positioned beneath the sensor. The controller can then be configured to assume that fuel delivered when a reefer trailer is positioned below the sensor is fuel to be used for the reefer trailer, and not for the power unit (i.e., for the tractor pulling the trailer). In at least one embodiment, the fuel island controller is configured to apportion fuel as follows. When the distance between the sensor ranges from about 39 inches to about 173 inches, and fuel delivery is enabled, that fuel is allocated to over the road use. If the sensor detects that the vehicle being fueled is repositioned, and the distance between the sensor and the vehicle now ranges from about 0 inches to less than about 38 inches (i.e., the sensor detects that the distance between the sensor and the vehicle has decreased), then any fuel delivered subsequently is assumed to be fuel for a reefer trailer, and not for over the road use (thus, the second portion of fuel can be taxed at a different rate). The decrease in distance between the sensor and the vehicle is because the fuel tanks for the over the road use are part of the power unit (i.e., the tractor), while the fuel tanks for a reefer are near a midpoint or rear of the reefer trailer, thus the vehicle needs to be moved to allow the fuel dispenser to reach the reefer fuel tanks.

In one or more of the embodiments disclosed herein, the fuel island processor (whether actually located at the fuel island or elsewhere) can be configured so that the fuel dispenser is disabled whenever the sensor detects distance 85, indicating that the vehicle has exited the fuel lane.

Figure 3:
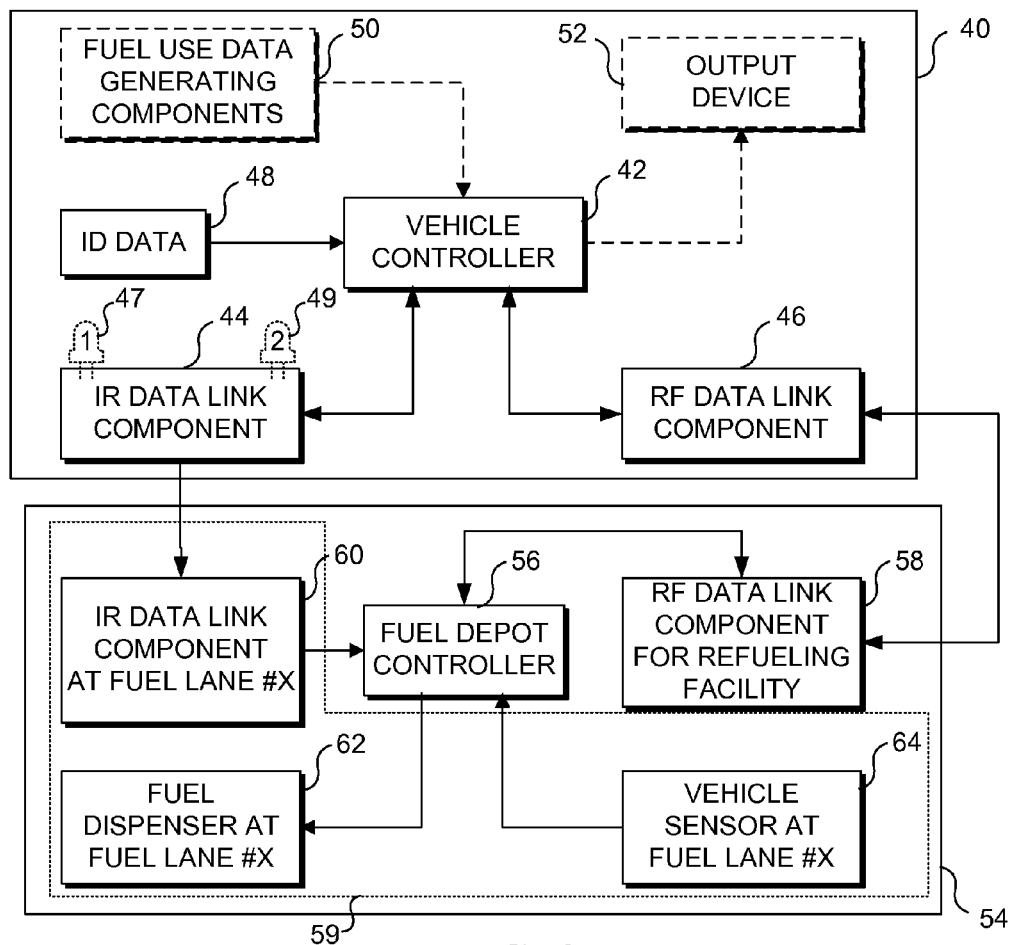
FIG. 3 is an exemplary functional block diagram showing the basic functional components used to implement the method steps of FIG. 1.

FIG. 3 is an exemplary functional block diagram showing the basic functional components used to implement the method steps of FIG. 1. Shown in FIG. 3 are an enrolled vehicle 40 and a refueling facility 54. Vehicle 40 includes a vehicle controller 42 implementing functions generally consistent with the vehicle functions discussed above in connection with FIG. 1 (noting that if desired, such functions could be implemented using more than a single controller), an IR data link component 44 (i.e., an IR emitter), an RF data link component 46 (i.e., an RF transmitter and an RF receiver, implemented as a single component or a plurality of separate components), and a memory 48 in which vehicle ID data (and/or fuel authorization verification data) are stored (noting that in some exemplary embodiments, the memory in which such data are stored is not part of a required fuel authorization component, such as a telematics unit, that is added to enrolled vehicles, such that removal of the added component alone is insufficient to enable the removed component to be used in a non-authorized vehicle to participate in the fuel authorization program), each such component being logically coupled to controller 42. In an exemplary embodiment, the IR data link component includes two lights 47 and 49, whose functions are discussed below. Vehicle 40 may also include an optional output device 52 that can be used to provide feedback or instructions relevant to the fuel authorization program to the vehicle operator, and fuel use data generating components 50 (i.e., components that collect data that can be used to calculate an amount of fuel used by the vehicle). Each optional component is logically coupled to the vehicle controller.

Refueling facility 54 includes a fuel depot controller 56 implementing functions generally consistent with fuel vendor functions discussed above in connection with FIG. 1 (noting that if desired, such functions could be implemented using more than a single controller) and an RF data link component 58 (i.e., an RF transmitter and an RF receiver, implemented as a single component or a plurality of separate components) logically coupled to controller 56. Refueling facility 54 will likely include a plurality of fuel lanes, including at least one fuel lane 59. Each fuel lane participating in the fuel authorization program includes an IR data link component 60 (i.e., an IR receiver) disposed proximate to a fuel dispenser 62, and a vehicle detecting sensor 64, each of which is logically coupled to controller 56. Note that controller 56 and RF component 58 of refueling facility 54 are intended to support a plurality of different fuel lanes participating in the fuel authorization program. As discussed below, the concepts disclosed herein also encompass embodiments where each participating fuel lane includes its own RF component and processor component.

To recap the functions implemented by the various components in the enrolled vehicle and the refueling facility in the exemplary fuel authorization method of FIG. 1, as the enrolled vehicle enters a fuel lane participating in the fuel authorization program, sensor 64 detects the vehicle, and processor 56 uses RF component 58 to send an RF query to the vehicle. The RF query is received by RF component 46 in an enrolled vehicle, and vehicle controller 42 responds by causing IR component 44 to transmit an IR response to IR component 60. An RF data link between the enrolled vehicle and the fuel vendor is thus established using RF components 46 and 58. ID data (such as a VIN) uniquely identifying the vehicle is acquired from memory 48 and conveyed to controller 56 using one or both of the IR and RF data links. In some embodiments, passwords or encryption keys are also stored in memory 48 and are used to confirm that the vehicle is enrolled in the fuel authorization program. Once the enrolled vehicle's status in the fuel authorization program is confirmed, controller 56 enables operation of fuel dispenser 62 (so long as sensor 64 indicates that the enrolled vehicle has not exited the fuel lane). It should be noted that if controller 56 and RF component 58 are used to support a plurality of different fuel islands participating in the fuel authorization program, then RF component 58 will need to have sufficient range, power, and bandwidth to support simultaneous operations with a plurality of fuel islands.

The function of optional lights 47 and 49 will now be discussed. IR data from IR component 44 is highly directional, and successful IR data transmission requires alignment between IR component 44 in the vehicle and IR component 60 in the fuel lane. A first light 47 is used to indicate to the driver of the vehicle that an IR data link has been established. A second light 49 is used to indicate to the driver of the vehicle that the IR data transmission is complete, such that if the vehicle needs to be moved relative to the fuel dispenser to enable the fuel dispenser to reach the vehicle's fuel tanks, the movement can be implemented without interrupting the IR data transmission. It should be recognized that other techniques (such as the use of a visual display, or audible prompts via output device 52) could similarly be used to convey corresponding information to the vehicle operator. Note that in embodiments employing such indicator lights, the IR data link need not be active during the refueling operation (i.e., the IR data link need only be operational long enough to establish the RF data link between the fuel vendor and the vehicle). In other embodiments, the IR data link is operational during refueling, to ensure that the vehicle remain at the fuel island during refueling, so no fuel can be diverted to an unauthorized vehicle.

Figure 4:
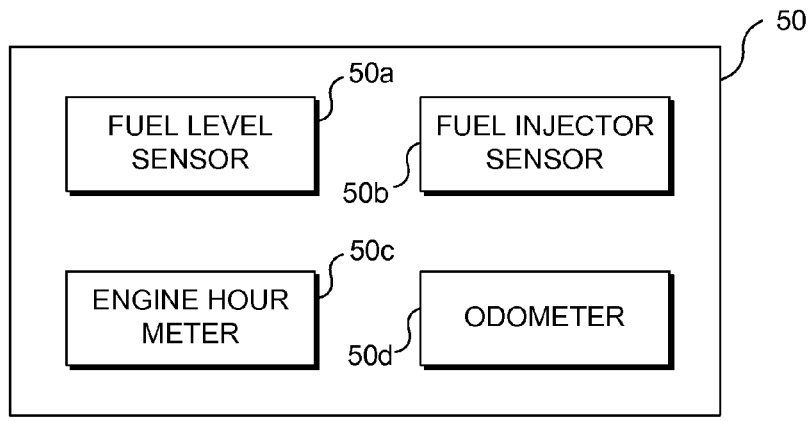
FIG. 4 is an exemplary functional block diagram showing some of the basic functional components used to collect fuel use data from a vehicle.

As noted above, in at least some embodiments, controller 42 also uses the RF data link between the vehicle and the refueling facility to transfer data other than that needed to verify that the enrolled vehicle is authorized to participate in the fuel authorization program. This additional data can include without any implied limitation: fault code data, vehicle performance and/or fuel efficiency and consumption data, and driver data (such as driver ID and the driver's accumulated hours for compliance and payroll). A potentially useful type of additional data will be fuel use data collected by components 50. FIG. 4 is a functional block diagram showing some exemplary components used to collect fuel use data, including a fuel tank level sensor 50*a* (indicating how much fuel is stored in the vehicle's fuel tanks before refueling), fuel injectors sensors 50*b* (configured to determine how much fuel has passed through the engine fuel injectors, indicating how much fuel has been consumed by the vehicle), an engine hour meter 50*c* (configured to determine how many hours the vehicle's engine has been operated, which can be used in addition to or in place of the fuel injector data to determine how much fuel the vehicle has consumed), and an odometer 50*d* (configured to determine how many miles or kilometers the vehicle has traveled, which can be used in addition to or in place of the fuel injector data (or engine hour data) to determine how much fuel the vehicle has consumed).

Exemplary Computing Device

Figure 5:
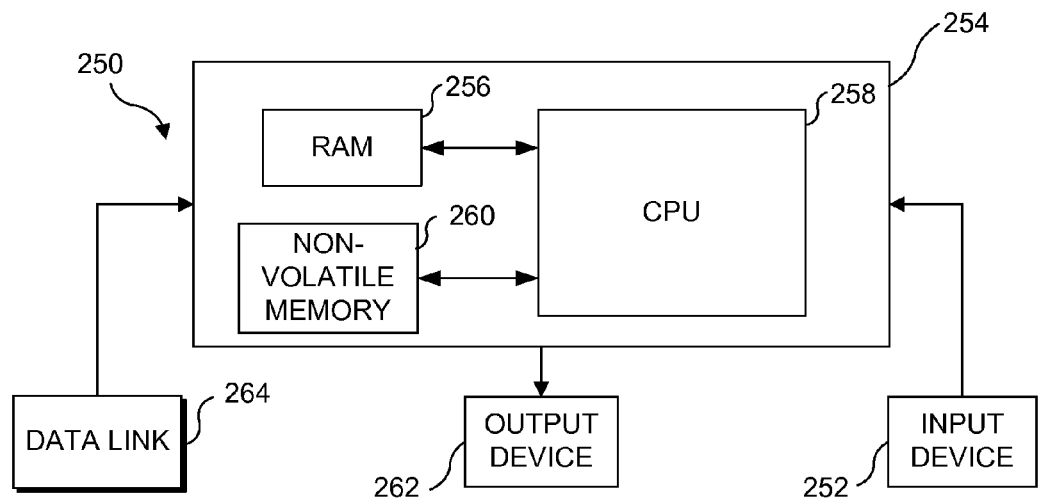
FIG. 5 is a functional block diagram of an exemplary computing device that can be employed to implement some of the method steps disclosed herein.

Steps in the methods disclosed herein can be implemented by a processor (such as a computing device implementing machine instructions to implement the specific functions noted above) or a custom circuit (such as an application specific integrated circuit). FIG. 5 schematically illustrates an exemplary computing system 250 suitable for use in implementing certain steps in the methods of FIG. 1 (i.e., for executing at least blocks 12, 13, 16, 20, 22, 24, and 26 of FIG. 1). It should be recognized that different ones of the method steps disclosed herein can be implemented by different processors (i.e., implementation of different ones of the method steps can be distributed among a plurality of different processors, different types of processors, and processors disposed in different locations). Exemplary computing system 250 includes a processing unit 254 that is functionally coupled to an input device 252 and to an output device 262, e.g., a display (which can be used to output a result to a user, although such a result can also be stored for later review or analysis). Processing unit 254 comprises, for example, a central processing unit (CPU) 258 that executes machine instructions for carrying out at least some of the various method steps disclosed herein, such as establishing, processing, or responding to RF or IR signals. The machine instructions implement functions generally consistent with those described above (and can also be used to implement method steps in exemplary methods disclosed hereafter). CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory may be an operating system software application and other software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device might be used to initially configure computing system 250, to achieve the desired processing (i.e., to compare subsequently collected actual route data with optimal route data, or to identify any deviations and/or efficiency improvements). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will typically comprise a monitor or display designed for human visual perception of output. Use of a conventional computer keyboard for input device 252 and a computer monitor for output device 262 should be considered as exemplary, rather than as limiting on the scope of this system. Data link 264 is configured to enable data collected in connection with operation of a fuel authorization program to be input into computing system 250. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet. Note that data from the enrolled vehicles will typically be communicated wirelessly (although it is contemplated that in some cases, data may alternatively be downloaded via a wire connection).

It should be understood that the term "computer" and the term "computing device" are intended to encompass networked computers, including servers and client device, coupled in private local or wide area networks, or communicating over the Internet or other such network. The data required to implement fuel authorization transactions can be stored by one element in such a network, retrieved for review by another element in the network, and analyzed by any of the same or yet another element in the network. Again, while implementation of the method noted above has been discussed in terms of execution of machine instructions by a processor (i.e., the computing device implementing machine instructions to carry out the specific functions noted above), at least some of the method steps disclosed herein could also be implemented using a custom circuit (such as an application specific integrated circuit).

Exemplary Telematics Device Including Position Sensing Component (GPS)

Figure 6:
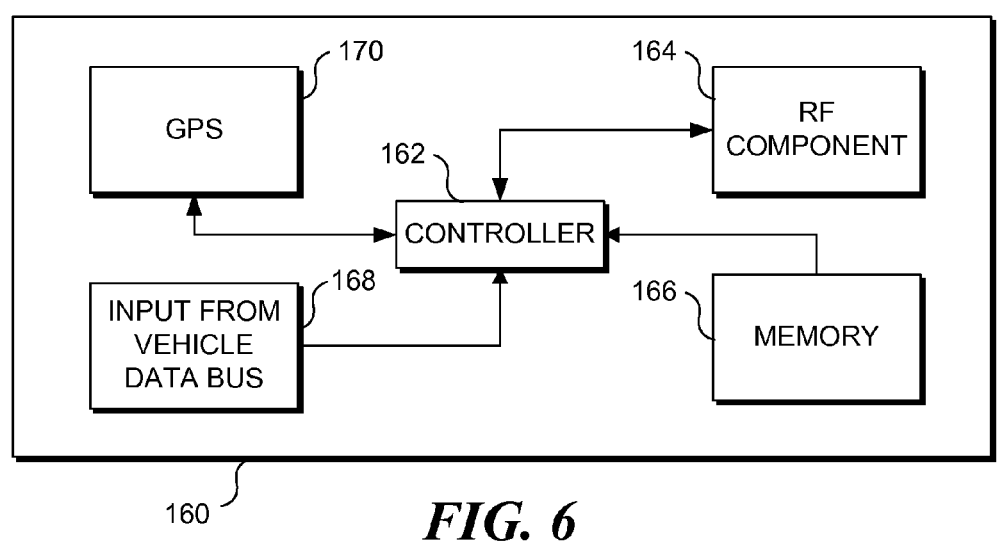
FIG. 6 is a functional block diagram of an exemplary telematics device added to an enrolled vehicle in one or more of the concepts disclosed herein.

FIG. 6 is a functional block diagram of an exemplary telematics device added to an enrolled vehicle to implement some of the method steps of FIG. 1, particularly providing verification data such a VIN from a non-removable memory in the vehicle, as well as providing additional data such as that defined in FIG. 4. An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data input component 168 configured to extract vehicle data from the vehicle's data bus and/or the vehicle's onboard controller.

Referring to FIG. 6, telematics unit 160 has capabilities exceeding those required for participating in a fuel authorization program. The additional capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use the RF component to wirelessly convey such data to vehicle owners. These data transmissions can occur at regular intervals, in response to a request for data, or in real-time, or be initiated based on parameters related to the vehicle's speed and/or change in location. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using RF component 164.

In at least one embodiment, encryption keys or passwords required by the fuel authorization program are stored in memory 166, and are accessed during one or more of the fuel authorization methods discussed above. To prevent parties from stealing telematics unit 160 and installing the unit on a non-authorized vehicle and attempting to use the stolen telematics unit to acquire fuel from the fuel authorization program, in at least one exemplary embodiment, the passwords/encryption keys required for authorized refueling are changed from time-to-time. Thus, the stolen telematics unit can only be used to access the fuel authorization program for a limited time. Note that an even more secure system can be achieved by storing the encryption keys or passwords not in memory 166, but in some other memory that is not easily removed from the vehicle, such that moving telematics unit 160 from the enrolled vehicle to a non-authorized vehicle will not enable the non-authorized vehicle to participate in the fuel authorization program, because the required passwords/encryption keys are not available in the non-authorized vehicle. In at least one further embodiment, the telematics unit is configured to acquire the VIN or other ID number needed to participate in the fuel authorization program from a memory in the vehicle that is not part of the telematics unit. In such an embodiment, if a telematics unit is stolen and installed on a vehicle not enrolled in the fuel authorization program, when the stolen telematics unit acquires the new vehicle's VIN as part of the fuel authorization methods discussed above, that vehicle would not be allowed to refuel under the authorization program, because the new vehicle's VIN would not be recognized as corresponding to an enrolled vehicle. In at least one embodiment, each telematics unit has a unique serial number, and the fuel authorization program can check the vehicle ID number and the telematics ID number to determine if they are matched in the database before enabling fuel to be acquired under the fuel authorization program, to prevent stolen telematics units, or telematics units moved without authorization, to be used to acquire fuel.

In a similar embodiment, telematics unit 160 is configured to receive updated passwords/encryption keys via RF component 164, but such passwords/keys are not stored in the telematics unit (or a separate memory in the vehicle) unless the telematics unit acquires a VIN or ID number (from a memory on the vehicle that is not part of the telematics unit) that matches an ID conveyed along with the updated encryption key/password. This approach prevents stolen telematics units from acquiring updated passwords or encryption keys.

Detecting when a Vehicle has Moved Away from Fuel Pump

Another method to detect movement is to utilize the vehicles internal sensors to indicate if the vehicle moves while the fuel pump is enabled. The data from these sensors is available on the vehicle's data bus and can include data from the anti-lock braking system (ABS), and speed indicators. The vehicle can tell the system controller that it is moving and the system controller can then stop dispensing fuel.

Truck Board/Puck

One newly disclosed aspect of the concepts disclosed herein is a truck board device (or puck, in reference to the shape of an exemplary implementation), i.e., a single component implementing the functions of the IR data link, the RF data link, and alignment lights discussed above. The puck is shown in various views in FIGS. 7-9. In at least some embodiments, the puck is coupled using a hard wire data connection into the exemplary telematics device of FIG. 6 (or the J-bus cable of FIG. 15), which in turn is coupled to a vehicle data bus, to enable a VIN to be acquired from the vehicle bus for fuel authorization programs where the vehicle VIN is part of the credentials required for fuel authorization. It should be understood that the puck can also be used in fuel authorization programs where the vehicle VIN in not required for fuel authorization, and in fuel authorization programs where no connection to the vehicle data bus is required.

The puck is intended to be placed on or near a windshield of a vehicle, so that the rear face of the puck is disposed in a facing relationship with the windshield, and an IR transmitter on the rear face of the puck can emit an IR beam outward and upward from the vehicle. A bracket (not shown) can be used to achieve the desired orientation. Such a configuration works well where the IR receiver at the fuel lane is disposed on a pole or canopy generally above the fuel pump. When mounted in such an orientation, the front face of the puck will be visible to the driver, so that he can see the alignment lights discussed in connection with FIG. 4, to ensure the vehicle is properly positioned to enable the IR data link to be established.

It should be noted that the concepts disclosed herein also encompass other puck designs (devices that include the IR transmitter and RF components, and firmware for participating in a fuel authorization program) where the IR transmitter in the puck is intended to transmit an IR bean in a different direction (i.e., to the side of the vehicle, toward an IR receiver mounted in a location other than a canopy or on a pole).

The following provides a summary of how the puck is used in at least one exemplary fuel authorization program. Once the vehicle arrives in a fuel lane, an ultrasonic sensor detects the truck in the fuel lane and an RF component at the fuel lane sends an interrogation pulse to the vehicle in the fuel lane, asking for the vehicle to identify itself and confirm what pump it is next to. The puck (using a microcontroller in the puck) acquires the VIN or other unique vehicle ID from the vehicle data bus (via the telematics device of FIG. 6 in some embodiments, or via a smart cable (a simplified device without the cell modem or GPS component of FIG. 6, see FIG. 15 for the smart cable), as generally discussed in greater detail below). The puck sends the vehicle ID to the fuel pump (pump board) via the IR data link. The pump board (a fuel authorization component at the fuel station that includes a processor and RF data link) then specifically queries the vehicle by VIN number, and an encrypted secure RF channel is opened between the pump board and the truck board (the puck). In at least one embodiment, the pump board is a single component combining the IR data link, the RF data link, a controller, and the ultrasonic sensor in a single housing. The pump board is logically coupled to a pump controller that authorizes fuel delivery. In at least some embodiments, the pump board is disposed in a canopy, and is connected to the pump controller via a hard wired connection. Note that permutations to the above fuel authorization paradigm can be supported by the puck. For example, in some fuel authorization embodiments enabled by the puck no VIN is required to be retrieved from a vehicle memory. The puck can store credentials for the vehicle in a memory component in the puck. In some embodiments, the puck can be connected to an input device, such as a keypad, and a driver can enter in some credentials, such as a PIN. In another fuel authorization program, the IR data link could be used only to send a pump ID from the pump to the truck (this would require placing an IR emitter at the fuel island and an IR receiver in the puck). All other data would be conveyed over the RF data link.

Note the puck is intended to be mounted using adhesive tape, industrial quality, on the inside of a windshield of a tractor. The bottom surface is flat to accommodate such a mounting configuration. In an exemplary embodiment, the puck includes three primary interfaces; a 2.4 GHz radio, an RS422 communications port and an interface port used to communicate with a telematics device (such as shown in FIG. 6), and an IR transmitter. The puck includes firmware and processing power sufficient to implement the functions of (1) requesting CAN-bus data from the telematics device (such as VIN), (2) interacting with fuel authorization components at the fuel vendor facility when the truck enters a fuel lane equipped with fuel authorization components. The puck will respond to radio requests that are sent from fuel authorization components at the fuel vendor facility, which can be requests for vehicle data generated by the telematics device or retrieved from the vehicle data bus by the telematics device. The puck will also send the truck or vehicle's Vehicle Identification Number (VIN) to the infrared receiver element in the fuel authorization components at the fuel vendor facility using the puck's IR transmitter. Additional exemplary details regarding the puck are provided in FIGS. 7-11.

FIG. 7 is a front elevation of an exemplary puck 300 implementing the RF and IR components that can be used in a vehicle enrolled in a fuel authorization program generally corresponding to the method of FIG. 1. Note that the alignment lights to be seen disclosed in FIG. 3 can be seen in a window 302. A light 304 has a first color, and a light 306 has a second color. A first light is used to indicate to the driver of the vehicle that an IR data link has been established. The second light is used to indicate to the driver of the vehicle that the IR data transmission is complete, such that if the vehicle needs to be moved relative to the fuel dispenser to enable the fuel dispenser to reach the vehicle's fuel tanks, the movement can be implemented without interrupting the IR data transmission.

FIG. 8 is a rear elevation of puck 300, enabling an IR transmitter 308 to be seen. An opening can be formed in the housing to enable IR radiation to be emitted from the IR transmitter, or a cover substantially transparent to IR radiation can be used. As noted above, the rear face is flat so the rear surface can be attached to a flat windshield using industrial adhesive tape. FIG. 9 is a side elevation of puck 300, enabling a hard wire data link port 310 (such as an RS422 communications port and an interface port) to be seen. Note that the power required by puck 300 can be supplied via port 310, by using a cable that can provide power and data, as is generally known in the art.

FIG. 10 is a functional block diagram showing some of the basic functional components used in puck 300. Such components include lights 304 and 306, IR emitter 308, controller 312, RF component 314, and memory 316. Memory 316 is used to store firmware (i.e., machine instructions) to control the functions implemented by puck 300 (noting that the controller could also be implemented as an ASIC, which may not require memory to control its functionality). In some embodiments memory 316 can also store credentials required in a fuel authorization program, although in at least some embodiments the puck is required by programming to obtain the credentials through a data port 310 (as shown in FIG. 9, but omitted from FIG. 10 for simplicity).

In at least one embodiment, controller 312 implements the function of energizing the IR transmitter upon receiving an RF query from a fuel vendor.

In at least one embodiment, controller 312 implements the function of energizing light 304 when an IR data link is established between the IR emitter in the puck and an IR receiver at the fuel lane.

In at least one embodiment, controller 312 implements the function of energizing light 306 when the transmission of data (such as credentials, which in some embodiments is a VIN from the vehicle) over the IR data link is completed, and the vehicle can be slightly repositioned to accommodate fueling.

In at least one embodiment, controller 312 implements the function of retrieving fuel authorization credentials from memory 316 upon receiving an RF query from a signal from a fuel vendor, and conveying those credentials over the IR data link.

In at least one embodiment, controller 312 implements the function of retrieving fuel authorization credentials from some memory component at the vehicle that is not part of puck 300, via data port 310 (FIG. 9), upon receiving an RF query from a signal from a fuel vendor, and conveying those credentials over the IR data link.

In at least one embodiment, controller 312 implements the function of using RF component 314 to determine if a reefer tag is present, upon receiving an RF query from a signal from a fuel vendor.

In at least one embodiment, controller 312 implements the function of requesting reefer tag data (discussed in greater detail below) using RF component 314 to determine if a reefer tag is present.

In at least one embodiment, controller 312 implements the function of using RF component 314 to communicate with the fuel vendor that the truck has left the fuel island when the IR data link is terminated (in such a fuel authorization paradigm, fuel delivery is only enabled when the IR data link is active).

FIG. 11 includes a plurality of plan views of a commercial implementation of the truck board device of FIG. 7.

It should be understood that the puck discussed above could be modified to function in other fuel authorization paradigms that also include an IR data link. One such variation involves fuel authorization paradigm that relies on a smart phone or tablet computing device (collectively referred to as a mobile computing device) in the enrolled vehicle that includes a fuel authorization application. The mobile computing device will include an RF component, or be logically coupled to an RF component (Wi-Fi being a particularly useful such RF data link). The mobile computing device will be logically coupled to a modified version of puck 300 that need not include an RF component, via data port 310 (i.e., a hard wire data link between the puck and the mobile computing device). The fuel authorization app on the mobile computing device will be launched when the mobile computing device receives an RF query from the fuel vendor. The fuel authorization app on the mobile computing device will instruct the modified puck to establish the IR connection with the fuel vendor. The fuel authorization app on the mobile computing device will provide credentials to the modified puck, which will be sent to the fuel vendor over the IR data link. That enables the fuel vendor to unambiguously determine which fuel lane the vehicle is at (the fuel land receiving the IR transmission). Additional information, if desired, can then be exchanged between the vehicle and fuel vendor over the RF/Wei-Fi network, generally as discussed above. The fuel authorization app on the mobile computing device can obtain the fuel authorization credentials in several ways. In at least one exemplary embodiment, the fuel authorization app on the mobile computing device prompts the driver to enter the credentials into the mobile computing device (such as keying in a PIN or other code). In at least one exemplary embodiment, the fuel authorization app on the mobile computing device can access the credentials from a memory in the mobile computing device. In at least one exemplary embodiment, the fuel authorization app on the mobile computing device acquires the credentials (such as a VIN) from a vehicle data bus (this can be achieved using a hardwire data link between the mobile computing device and the vehicle data bus, or via the smart cable of FIG. 14). In still another embodiment, the credentials are stored in modified puck.

Reefer Fuel

A related fuel authorization system employs additional components that enable fuel to be delivered to fuel tanks for running refrigeration units on trailers of refrigerated cargo boxes (i.e., "reefers"). A modified puck is attached to the reefer trailer. The reefer puck (or reefer tag; see FIGS. 11 and 12) includes a rugged housing enclosing a microcontroller and an RF component. A physical data link couples the Reefer Puck to the reefer trailer, so the Reefer Puck can determine if the trailer is coupled to a tractor, and if the reefer cooler motor is engaged (in at least one embodiment oil pressure is used to determine if the cooler motor is on or off). The microcontroller in Reefer Puck tracks engine hours for the cooler motor, and conveys the engine hours over an RF data link from the Reefer puck to the truck puck (i.e., puck 300) discussed above. In at least one embodiment, the fuel vendor analyzes the cooler motor hours to determine if, or how much, reefer fuel should be dispensed, based on a historical record of past hours and fuel consumed. The fuel vendor can track reefer fuel separately from tractor fuel, as reefer fuel is not subject to the same fuel taxes.

FIG. 12 is a front elevation of an exemplary device 320 (also referred to herein as a reefer tag 320) that can be used in connection with the truck board device of FIG. 7 to either authorize fuel delivery to a refrigerated trailer pulled by a vehicle enrolled in a fuel authorization program generally corresponding to the method of FIG. 1, and/or to facilitate automated collected of fuel use data from a refrigerated trailer.

Reefer tag 320 includes a data cable 322 (which also is used to provide electrical power to reefer tag 320, generally as discussed above) and a data connector 324 enabling reefer tag 320 to be connected with a refrigerated trailer pulled by a vehicle enrolled in a fuel authorization program (for receiving data and power). Reefer tag 320 includes lights 330 and 332 (preferably different colors) that are active during operation. In an exemplary embodiment, the lights are covered by a light pipe, and the lights are LED indicators. A red LED is for power indication and a green LED is for an active radio link (blinking, in at least one embodiment). Note the Reefer Puck or Reefer tag is enclosed in a ruggedized housing for industrial environments.

FIG. 13 is a functional block diagram showing some of the basic functional components used in the reefer tag 320. Such components include lights 330 and 332, data cable 322 controller 324, RF component 328, and memory 326. Memory 326 is used to store firmware (i.e., machine instructions) to control the functions implemented by reefer tag 320 (noting that the controller could also be implemented as an ASIC, which may not require memory to control its functionality). Memory 326 also includes a unique identifier for each reefer tag 320, so that individual refrigerated trailers can be identified during fuel authorization.

In at least one embodiment, controller 324 implements the function of using cable 322 to determine if the trailer that reefer tag 320 is attached to is coupled to a tractor unit upon receiving an RF query from either a puck 300 or a fuel vendor. If the trailer that reefer tag 320 is attached is not coupled to a tractor, it is unlikely the trailer requires fuel. More than likely, the trailer is parked near a fuel vendor, and the RF query can be ignored.

In at least one embodiment, controller 324 implements the function of retrieving a unique ID from memory 326 and conveying that ID over an RF data link in response to receiving an RF query from a fuel vendor or a puck 300.

In at least one embodiment, controller 324 implements the function of using cable 322 to determine if the compressor in the refrigerated unit in the trailer that reefer tag 320 is attached to on, such that cumulative run time can be stored in memory 326.

In at least one embodiment, controller 324 implements the function of using cable 322 to acquire engine hour data from a compressor in the refrigerated unit in the trailer that reefer tag 320 is attached to on, such that cumulative run time can be stored in memory 326.

In at least one embodiment, controller 324 implements the function of conveying cumulative engine hour data (for the compressor in the refrigerated unit in the trailer that reefer tag 320 is attached to) over the RF data link, in response to receiving an RF query from a fuel vendor or a puck 300.

In at least one embodiment, controller 324 implements the function of energizing light 330 when reefer tag 320 has established an RF data link is active.

In at least one embodiment, controller 324 implements the function of energizing light 332 when reefer tag 320 is receiving power from the refrigerated trailer it is installed upon.

In at least one embodiment, controller 324 implements the function of periodically sending cumulative engine hour data (for the compressor in the refrigerated unit in the trailer that reefer tag 320 is attached to) over the RF data link, whenever an RF data link between the reefer tag and a puck is available.

The refrigerated trailer (RT) system is designed as an extension to the fuel authorization method of FIG. 1 (and related methods) and will allow related fuel authorization systems to 1) identify when a truck with an enrolled vehicle including a puck 300 and reefer tag 320 has pulled into a fuel lane equipped to support the fuel authorization method, 2) provide a unique identifier for a trailer equipped with reefer tag 320, and 3) indicate if the truck is positioned to pump truck fuel or reefer trailer fuel.

Power is provided to reefer tag 320 from the reefer system 12V battery. The reefer tag is designed to draw minimal power from the reefer and will shut itself down when the truck is stopped and the reefer is not running.

In at least one exemplary embodiment, reefer tag 320 and cable 322 employ an RS-232 interface, will be available for future enhancements to integrate with existing reefer telematics systems.

In at least one exemplary embodiment, reefer tag 320 includes engine run detection functionality, so the reefer tag can track engine hours in the reefer chiller unit. Engine hours can then be used to calculate fuel consumed, and a quantity of fuel required to fill a tank of known size. Note that reefer chiller units generally operate at predictable efficiency levels, making it possible to reasonably accurately determine how empty a fuel tank is, based on starting with a full tank and knowing how many hours the chiller ran.

In exemplary embodiment, reefer tag 320 is waterproof and dustproof, and is IP67 rated. Each reefer tag 320 will have a unique serial number that will be visible when installed. This serial number will be used over the air to identify the device.

When the device is powered up it will automatically query for a truck radio (i.e., a puck 300) to pair with over the radio interface (RF data link). A signal strength protocol can be used to deal with multiple trucks trying to pair with the reefer tag. Once paired the reefer tag will transmit its serial number to the corresponding puck 300. A heartbeat message will be sent between the reefer tag and the truck radio to ensure the two stay paired.

The reefer tag will monitor the engine run detector to determine if the engine is running. While the engine is running it will count the number of minutes the engine runs. That number will be transmitted with the serial number in each heartbeat message. When the reefer tag is powered down the engine run counter will be stored in non-volatile memory and will be read at power-up.

If the reefer tag is configured to utilize the RS-232 interface then the reefer tag will either simply read a string from the serial port using a configured field separator or it will periodically query the serial port and parse the results. The data read from the RS-232 port may include a serial number, engine run hours, or fuel level. This data will be included in the heartbeat message to the truck radio.

Once paired the reefer tag will: Update the engine run time periodically (minimum of 15 minutes) if it is configured to collect engine run time through the sensor. Collect data over the RS-232 interface periodically (minimum of 15 minutes) if configured to do so. Transmit the most current data (engine run hours, serial number, fuel level, etc.) to the truck radio (i.e., puck 300) via the heartbeat message.

In an exemplary embodiment, the combination of reefer tag 320 and puck 300 will be used with the exemplary telematics device of FIG. 6. The telematics device will be programmed to generate a log message every time it pairs with a reefer tag and every time it drops a connection with a reefer tag, except for power off and power on events not associated with the trailer being disconnected from the tractor unit.

Smart Cable

As discussed above FIG. 6 discloses an exemplary telematics box including a GPS component and a cell modem. That unit is relatively expensive, and some fleet operators may not want to purchase such a unit, but still may want to participate in a fuel authorization program. Note that one aspect of some of the fuel authorization methods disclosed above was requiring some component to obtain a vehicle ID (such as a VIN) from a vehicle data base or vehicle controller that could not be readily moved from the vehicle, to reduce the chance that a fuel authorization component would be moved from one vehicle to another to defeat the system. To provide a lower cost option, the ZTOOTH™ smart cable (or smart cable, or J-bus cable) was developed. The smart cable includes a controller configured to enable the smart cable to pull information (such as the VIN or unique vehicle ID) from a vehicle data bus or controller.

FIG. 14 is a rear elevation of an exemplary smart cable 336 that can be used to acquire vehicle data from a vehicle data bus, and convey that data to a mobile computing device, which in at least some embodiments is employed in a fuel authorization program. Smart cable 336 includes a rugged housing 335, mounting lugs 332, a data cable 344a and data plug 334b (to enable the smart cable to be plugged into a vehicle data bus), and one or more of a wireless data link element 334b (such as Wi-Fi, Bluetooth, or RF), and a data port 334a (to enable the smart cable to be plugged into a computing device to receive data from the vehicle data bus, noting that such a computing device can include smart phones, tablets, telematics devices including a processor such as shown in FIG. 6, or the puck of FIG. 7). Some embodiments include both elements 334a and 334b, while other embodiments include only one or the other. It should be noted that some versions of smart cable 336 will have different plugs 344b to enable different versions of the smart cable to plug into different ports in different vehicles (such as a deustch connector or OBD, or OBD-II plug). It should also be noted that some versions of smart cable 336 may not include any plug, as cable 344a will be custom wired into the vehicle data bus where no data port is available.

FIG. 15 is a functional block diagram showing some of the basic functional components used in smart cable 336. Smart cable 336 performs the function of providing a communication link between a vehicle data bus and another computing device, such as a mobile computing device (including tablets and smart phones and the telematics device of FIG. 6), or the Truck Puck (puck 300) used in a fuel authorization program, generally as discussed above. Smart cable 336 includes a data link 334 for talking to a computing device (the device that wants data acquired from a vehicle data bus), a controller 340 that implements the function of acquiring specific data from a vehicle data bus, and a data link 344 to the vehicle data bus.

It should be understood that the potential uses of smart cable 336 extend well beyond the fuel authorization concepts emphasized herein.

In one related embodiment, smart cable 336 is used to enable smart phone uses to extract vehicle fault code data to their smart phones. In at least one embodiment, a party selling the smart cable charges a fee for each use of the smart cable to access data from the vehicle data bus. Besides fault code data, other data include, but are not limited to, throttle position data, fuel use data, and all other data available via the vehicle data bus/ECU.

In another related embodiment, smart cable 336 is used in connection with a fuel authorization system, such as disclosed in commonly owned patent titled METHOD AND APPARATUS FOR FUEL ISLAND AUTHORIZATION FOR THE TRUCKING INDUSTRY, Ser. No. 12/906,615, the disclosure and drawings of which are hereby specifically incorporated by reference. In such an embodiment, smart cable 336 is used to extract a VIN or ZID that is used in the fuel authorization process, generally as described in the reference patent.

Smart cable 336 can be paired with puck 300 of FIG. 7, to implement all the truck side components required for the fuel authorization method of FIG. 1. Significantly, if the telematics unit of FIG. 6 is used instead of smart cable 336 to implement the fuel authorization method of FIG. 1, then the fleet operator will receive GPS data and fuel authorization functionality from the same hardware. Smart cable 336 when paired with puck 300 will be limited to enable fuel purchase only (and whatever other data can be extracted from the vehicle data bus, such as fault codes), not collection of GPS data.

Each smart cable 336 is serialized (preferably a serial number that is printed on the exterior of the device) and is used to uniquely identify the smart cable. This serial number will be transmitted to the fuel vendor over the RF data link provided by puck 300, when the smart cable is logically coupled to the puck. Each smart cable 336 shall dynamically obtain the VIN from the truck data bus and provide the VIN to the puck, which will convey the VIN to the fuel vendor, generally as described above.

The smart cable will support automated, remote fuel transaction authorization, generally consistent with the fuel authorization concepts disclosed herein. Referring to FIG. 1, the smart cable will be used to obtain a VIN required for the verification data component of block 18. Referring to FIG. 3, the controller portion of both the smart cable and puck of FIG. 7 will implement functions of vehicle controller 42. The smart cable will: (1) Interface with the J1939 interface on a truck and be able to acquire a VIN and other data (fault codes, engine hours, etc. from the vehicle data bus). (2) Interact with the truck board (aka puck) of FIG. 7 (which implements the IR and RF data link elements of the fuel authorization systems disclosed herein). This means that the smart cable will converse with the fuel vendor over the RF data link in the puck so that a truck enrolled in the fuel authorization method of FIG. 1 will be able to identify itself to the fuel vendor, and ultimately authorize a transaction. (3) Support the reefer tag of FIG. 12. (4) Be equipped with a Bluetooth interface (or other wireless data link) so the smart cable can be paired with another device (smart phone, tablet, etc.) over Bluetooth. (5) Should only require a "one-time" configuration that is managed from the paired device. It should be recognized that the smart cable will include some amount of on-board memory. It is possible that some data, such as related to an intermittent fault code, could be stored in the on-board memory to be added to the data offloaded during refueling above. In general, the smart cable is intended to act as a data link between a vehicle data bus and a computing device (such as a smart phone, tablet, or the puck of FIG. 7) rather than device intended to store relatively large amounts of data.

Fuel Authorization Based on Fuel Tank Reading

Another aspect of the concepts disclosed herein relates to equipping vehicles enrolled in a fuel authorization program with a fuel tank sensor to monitor the ullage (i.e., the empty space) in a fuel tank. The readings from the fuel tank sensor can be used in a number of different ways. In at least some embodiments, the fuel authorization controller at the vehicle automatically uses the fuel tank sensor data and known tank size to include in a fuel authorization request sent to a fuel vendor data defining how much fuel is required to fill the vehicle fuel tanks. In at least some embodiments, the fuel vendor consults data from a source other than the vehicle (such as records maintained by the fuel authorization program) to determine how large the vehicles fuel tanks are, and to calculate how much fuel is required. It should be noted that in the description that follows, reference is made to only a single fuel tank at an enrolled vehicle; however, such concepts can be applied to enrolled vehicles including more than one fuel tank.

In a first exemplary embodiment, based on the fuel authorization programs described herein requiring both IR and RF data links between the vehicle and the fuel vendor, such fuel tank sensor readings are automatically sent to the fuel vendor from the enrolled vehicle, along with fuel authorizations credentials. The fuel vendor, after determining if the credentials are valid, will only authorize dispensing the amount of fuel required to fill the fuel tank at the enrolled vehicle based on the fuel tank sensor data provided by the vehicle.

In at least one related exemplary embodiment, a fuel authorization controller at the vehicle automatically sends the fuel tank sensor data to the fuel vendor over the IR data link in response to an RF query from the fuel vendor. Receipt of the fuel tank sensor data at a specific fuel pump unambiguously identifies which fuel pump needs to be enabled to deliver fuel to that enrolled vehicle. The fuel tank sensor data can also be automatically sent from the vehicle to the fuel vendor over the RF data link, which enables the fuel vendor to unambiguously identify which channel in a multi-channel RF data link is being used by which enrolled vehicle, which is useful if multiple enrolled vehicles can be present at the same fuel vendor at the same time.

In at least one related exemplary embodiment, a fuel authorization controller at the vehicle automatically sends the fuel tank sensor data to the fuel vendor over the RF data link after the fuel authorization controller at the vehicle automatically transmits at least some of the fuel authorization credentials over the IR data link.

In at least one related exemplary embodiment, the fuel authorization controller at the vehicle applies a correction factor to the fuel sensor data before sensing a fuel authorization request to the fuel vendor, to request slightly less, or slightly more, fuel than would be required to fill the vehicle's fuel tanks based on the fuel tank sensor data collected at the vehicle. In an exemplary but not limiting embodiment, the vehicle automatically requests 5% less fuel than would be required to fill the vehicle's fuel tanks based on the fuel tanks sensor data collected at the vehicle (understanding that other exemplary values could be selected, including 1%, 2.5%, and 10%, and understanding that the fuel authorization controller at the vehicle could similarly automatically reduce a number of gallons to request by some predefined amount, including but not limited to 1 gallon, 2.5 gallons, 5 gallons, and 10 gallons). In at least one related embodiment, the fuel authorization controller at the vehicle applies one or more of the following factors in determining if less (or more) fuel should be requested: (1) data indicating that prices at the current fuel vendor are relatively high, (2) data indicating that prices at the current fuel vendor are relatively low; (3) data indicating that the vehicle is routed to travel relatively long distance before completing a trip; (4) data indicating that the vehicle is routed to travel a relatively short distance before completing a trip; and (5) predetermined correction factors defined by a fleet owner.

In at least one related exemplary embodiment, a fuel authorization controller at the fuel vendor applies a correction factor to the fuel authorization request received from the enrolled vehicle, so that slightly less, or slightly more, fuel is authorized that would be required to fill the vehicle's fuel tanks based on the fuel tanks sensor data collected at the vehicle. In an exemplary but not limiting embodiment, the fuel vendor authorizes about 5% less fuel than would be required to fill the vehicle's fuel tanks based on the fuel tanks sensor data collected at the vehicle (understanding that other exemplary values could be selected, including about 1%, about 2.5%, and about 10%, and understanding that the fuel vendor could similarly automatically reduce a number of gallons to deliver by some predefined amount, including but not limited to about 1 gallon, about 2.5 gallons, about 5 gallons, and about 10 gallons). Fuel vendors may want increase the amount to be delivered to maximize sales, although in general if extra fuel is authorized but not delivered, the fuel authorization program will only charge the vehicle for the amount of fuel actually delivered.

In a second exemplary embodiment, based on the fuel authorization programs described herein requiring fuel authorizations credentials to be dynamically retrieved from a vehicle data bus (such that fuel authorization components cannot simply be moved to a non-enrolled vehicle to enable fuel authorization at the non-enrolled vehicle), such fuel tank sensor readings are automatically sent to the fuel vendor from the enrolled vehicle, along with dynamically retrieved fuel authorizations credentials. The fuel vendor, after determining if the credentials are valid, will only authorize dispensing the amount of fuel required to fill the fuel tank at the enrolled vehicle based on the fuel tank sensor data provided by the vehicle.

In at least one related exemplary embodiment, a fuel authorization controller at the vehicle automatically sends the fuel tank sensor data and the dynamically retrieved fuel authorizations credentials to the fuel vendor over an RF data link in response to an RF query from the fuel vendor.

The correction factors noted above (i.e., requesting or authorizing slightly more, or slightly less fuel than theoretically required to fill the enrolled vehicle's fuel tank based on the current sensor tank data) can be similarly implemented in the second exemplary embodiment.

In a third exemplary embodiment, once the fuel vendor has verified the credentials and authorized dispensing of a specific amount of fuel based on the fuel tank sensor data sent by the enrolled vehicle in a fuel authorization request, the fuel vendor determines if the fuel pump being used automatically shut off (to avoid spillage) before the authorized amount of fuel was dispensed. Most fuel pumps are designed to automatically shut off once a vehicle tank is full, to reduce spillage. If so, the fuel vendor automatically sends a message to the enrolled vehicle indicating that the fuel tanks sensor data was incorrect, and a fuel authorization processor at the enrolled vehicle automatically applies a calibration factor to the fuel tank sensor, so future fuel tank sensor data used in subsequent fuel authorization requests is more accurate.

In at least one related exemplary embodiment, the fuel authorization controller at the vehicle applies automatically reduces future fuel sensor readings by about 5% (understanding that other exemplary values could be selected, including about 1%, about 2.5%, and about 10%, and understanding that the fuel authorization controller at the vehicle could similarly automatically translate the reduction into gallons, rather than a percentage, including but not limited to about 1 gallon, about 2.5 gallons, about 5 gallons, and about 10 gallons).

In a fourth exemplary embodiment, once the fuel vendor has finished dispensing the amount of fuel authorized based on the fuel tank sensor data sent by the enrolled vehicle in a fuel authorization request, the fuel authorization processor at the enrolled vehicle automatically takes another fuel tank sensor reading. If the fuel tank sensor reading indicated that the fuel tank is not full, the fuel authorization processor at the enrolled vehicle automatically applies a calibration factor to the fuel tank sensor, so future fuel tank sensor data used in subsequent fuel authorization requests is more accurate.

In at least one related exemplary embodiment, the fuel authorization controller at the vehicle applies automatically reduces future fuel sensor readings by about 5% (understanding that other exemplary values could be selected, including about 1%, about 2.5%, and about 10%, and understanding that the fuel authorization controller at the vehicle could similarly automatically translate the reduction into gallons, rather than a percentage, including but not limited to about 1 gallon, about 2.5 gallons, about 5 gallons, and about 10 gallons).

In a fifth exemplary embodiment, vehicles enrolled in the fuel authorization program automatically periodically send fuel tank sensor data over a long range wireless data link to a remote monitoring service (i.e., the fuel tank sensor data is not just provided to a fuel vendor during a fuel transaction, but much more frequently, as part of normal vehicle operation). Participating fuel vendors automatically send details regarding each authorized fuel transaction to the monitoring service. The monitoring service automatically analyzes the fuel tank sensor data from enrolled vehicles and fuel transaction data for those enrolled vehicles, and determines if the fuel tank sensor in a particular vehicle needs to be calibrated. If so, the monitoring service communicates that to the fuel authorization processor at the enrolled vehicle, which automatically applies a calibration factor to the fuel tank sensor, so future fuel tank sensor data used in subsequent fuel authorization requests is more accurate.

It should be understood that the fuel tank sensor data can also be incorporated into other fuel authorization paradigms, including those employing proximity sensors and video cameras.

FIGS. 16-20 provide additional details on incorporating fuel tank sensor readings into fuel authorization programs.

FIG. 16 schematically illustrates vehicle components and fuel vendor components used to implement a fuel authorization program requiring fuel tank readings from enrolled vehicles for fuel authorization;

A fuel tank sensor 132 (such as an ultrasonic tank level reader) is attached to a fuel tank 130. The sensor is attached to a fuel authorization system including an RF component 126, generally as discussed above (and discussed in more detail in connection with FIG. 17). When the vehicle arrives proximate a fuel pump 128 (generally using the techniques disclosed above), the fuel tank reading is conveyed to the fuel vendor over a vendor RF data link 136. A fuel vendor authorization controller (generally shown as pump controller 138, noting that the fuel vendor authorization controller and a separate pump controller can be implemented as a network including multiple controllers) determines how much fuel to dispense based on the data provided by the vehicle (such data includes fuel tank sensor data, or a specific fuel request based on the fuel tank sensor data). A check is made to determine if additional fuel is justified based on known during behavior, such as mileage traveled and fuel consumption rates (note that the fuel authorization controller at the vehicle might be making such a request for additional fuel, or even a $3^{rd}$ party monitoring service participating in the fuel authorization program along with the fleet operating the enrolled vehicles and the fuel vendor). Alternately, the amount of fuel authorized is limited to the ullage indicated by the tank sensor.

Some sort of learning period may be required to normalize readings from a tank sensor to a specific vehicle.

The tank measurements can be used alone or in connection with the fuel authorization techniques disclosed above that require the vehicle to provide a unique ID, such as a VIN, from a non-removable vehicle memory, as well as fuel authorization embodiments that require the use of IR and RF data links in combination.

On some vehicles the manufacturers OEM fuel tank sensor can provide data to the fuel authorization system through the vehicles existing data bus. In this case the vehicles OEM fuel tank sensor can be utilized to determine the fuel tank reading which is then conveyed to the fuel vendor.

FIG. 17 is an exemplary functional block diagram showing the basic functional components required at an enrolled vehicle to implement a fuel authorization program requiring fuel tank readings from enrolled vehicles for fuel authorization. Shown in FIG. 17 is an enrolled vehicle 40a including a vehicle fuel authorization controller 42a implementing functions generally consistent with the vehicle functions discussed above in connection with FIG. 18-20 (below; noting that if desired, such functions could be implemented using more than a single controller, in one or more components, include a telematics device and/or a puck including one or more of an IR data link component and an RF data link component), an option IR data link component 44 (i.e., an IR emitter; for embodiments requiring both IR and RF data links, noting the fuel tank sensor data can be used in various fuel authorizations programs, some of which don't require an IR data link), an RF data link component 46 (i.e., an RF transmitter and an RF receiver, implemented as a single component or a plurality of separate components), and a memory 48a in which vehicle ID data (and/or fuel authorization verification data) and/or machine instructions controller processor 42a are stored (noting that in some exemplary embodiments, the memory in which such data are stored is not part of a required fuel authorization component, such as a telematics unit, that is added to enrolled vehicles, such that removal of the added component alone is insufficient to enable the removed component to be used in a non-authorized vehicle to participate in the fuel authorization program), each such component being logically coupled to controller 42a.

To recap the functions implemented by the various components in the enrolled vehicle and the refueling facility in an exemplary fuel authorization method involving fuel tank sensor data, as the enrolled vehicle enters a fuel lane participating in the fuel authorization program, a sensor detects the vehicle, and a fuel vendor processor uses an RF component to send an RF query to the vehicle. The RF query is received by RF component 46 in an enrolled vehicle, and vehicle controller 42a responds by causing IR component 44 to transmit an IR response to a vendor IR component at the fuel island. That IR data link unambiguously identifies the fuel lane. The IR transmission can include no data, the fuel tank data, or fuel authorization data dynamically retrieved from the vehicle data bus or a non-removable vehicle memory, or any combination or permutation thereof. An RF data link between the enrolled vehicle and the fuel vendor is thus established using RF components 46 and a corresponding fuel vendor RF component (see for example FIG. 3). ID data (such as a VIN) uniquely identifying the vehicle is acquired from memory 48a and conveyed to the fuel vendor controller using one or both of the IR and RF data links. In some embodiments, passwords or encryption keys are also stored in memory 48a and are used to confirm that the vehicle is enrolled in the fuel authorization program. Once the enrolled vehicle's status in the fuel authorization program is confirmed, the fuel vendor controller enables the fuel pump to dispense an amount of fuel generally sufficient to fill the fuel tank based on the fuel tank sensor data so long as the enrolled vehicle has not exited the fuel lane.

As noted above, in at least some embodiments, controller 42a also uses the RF data link between the vehicle and the refueling facility to transfer data other than that needed to verify that the enrolled vehicle is authorized to participate in the fuel authorization program. This additional data can include without any implied limitation: fault code data, vehicle performance and/or fuel efficiency and consumption data, and driver data (such as driver ID and the driver's accumulated hours for compliance and payroll).

FIG. 18 is a logic diagram showing exemplary method steps implemented in a fuel authorization program requiring fuel tank readings from enrolled vehicles for fuel authorization, where the fuel vendor determines if the fuel tank sensor in an enrolled vehicle requires calibration.

Significantly, the method of FIG. 18 requires that the enrolled vehicle provide sensor tank data to the fuel vendor, in addition to whatever other fuel authorization credentials the fuel vendor requires, such that the fuel vendor will only authorize an amount of fuel sufficient to fill the vehicles fuel tanks as indicated by the fuel sensor data (noting that in certain embodiments, either slightly less or slight more fuel may be authorized, generally as discussed above). In a block 350, a fuel authorization processor at the enrolled vehicle automatically responds to a query from the fuel vendor by sending the fuel vendor fuel tank sensor data and fuel authorization credentials. It should be understood that the term fuel tank sensor data is intended to encompass one of more of the following: a request from the vehicle for a specific quantity of fuel (based on a calculated quantity required to fill the fuel tank based on the fuel tank sensor reading) and data defining how full (or empty) the vehicle's fuel tank is, so that the fuel vendor looks up in a fuel transaction database a size of the vehicle's fuel tanks, and the fuel vendor performs the calculation to determine how many gallons of fuel to dispense. It should also be noted that the concepts disclosed herein encompass embodiments where the fuel authorization controller in the vehicle is programmed to ask for slightly less fuel than needed all the time, to ask for slightly less fuel than needed under certain circumstances (instructions from a fleet owner, the local price of fuel, the relative distance the vehicle needs to travel to return to a home base or arrive at an alternate fueling location, etc.), and to ask for slightly more fuel than is estimated to be needed (to make sure the tanks are filled to maximum capacity).

In a block 352 the fuel vendor fuel authorization controller automatically reviews the fuel authorization credentials, and if necessary calculates how much fuel is required to fill the tanks (noting the vehicle fuel authorization processor might perform this calculation). In a block 354 the fuel vendor fuel vendor fuel authorization controller automatically enables delivery of the determine amount of fuel. In a decision block 356, the fuel vendor fuel authorization controller automatically determines if the fuel pump shut off early (fuel pumps are designed to shut off automatically when a fuel tank is fuel to avoid spillage), or if the calculated amount of fuel was actually delivered. If there was no early shutoff, the logic terminates. However, if an early fuel shutoff was detected, then the fuel vendor fuel authorization controller automatically sends a communication to the vehicle fuel authorization controller in a block 358 indicating that not all the requested fuel was needed. That communication can provide details as to what percentage of the requested amount, and/or a number of gallons of fuel that was not delivered. In a block 360 the vehicle fuel authorization controller automatically determines a calibration factor to apply to subsequent fuel tank readings to make them more accurate for future fuel transaction requests. The calibration factor can be applied in several manners. The calibration factor can be a percentage error reported by the fuel vendor. The calibration factor can be a number of gallons as reported by the fuel vendor. The calibration factor can be adjusted up or down based on data provided by the fuel vendor. For example, if the fuel vendor reports a 5% error, the vehicle fuel authorization controller can be programmed to automatically increase or decrease that amount, and apply a correction factor of 4%, or 6% (such correction factors being exemplary and not limiting). Similarly, if the fuel vendor reports a 15 gallon error, the vehicle fuel authorization controller can be programmed to automatically increase or decrease that amount, and apply a correction factor of 13 gallons, or 17 gallons (such correction factors being exemplary, and not limiting).

FIG. 19 is a logic diagram showing exemplary method steps implemented in a fuel authorization program requiring fuel tank readings from enrolled vehicles for fuel authorization, where a fuel authorization controller at the vehicle determines if the fuel tank sensor in the vehicle requires calibration.

Significantly, the method of FIG. 19 also requires that the enrolled vehicle provide sensor tank data to the fuel vendor, in addition to whatever other fuel authorization credentials the fuel vendor requires, such that the fuel vendor will only authorize an amount of fuel sufficient to fill the vehicles fuel tanks as indicated by the fuel sensor data (noting that in certain embodiments, either slightly less or slight more fuel may be authorized, generally as discussed above). Where steps are the same as in the method of FIG. 18, the same reference numerals have been employed. In block 350, the fuel authorization processor at the enrolled vehicle automatically responds to a query from the fuel vendor by sending the fuel vendor fuel tank sensor data and fuel authorization credentials. In block 352 the fuel vendor fuel authorization controller automatically reviews the fuel authorization credentials, and if necessary calculates how much fuel is required to fill the tanks (noting the vehicle fuel authorization processor might perform this calculation). In block 354 the fuel vendor fuel authorization controller automatically enables delivery of the determine amount of fuel.

The logic now changes as compared to the method of FIG. 18 (it should be noted that in some embodiments the method steps of FIGS. 18 and 19 are combined). In a block 355, once the fuel transaction is complete, the vehicle fuel authorization controller automatically acquires a new fuel tank reading. Several different techniques can be used to trigger block 355 (the new reading). The vehicle fuel authorization controller can receive a signal from a vehicle ignition that the vehicle has been started. The vehicle fuel authorization controller can receive a signal from a transmission that the vehicle has been placed in gear. The vehicle fuel authorization controller can receive a signal from a vehicle engine controller that a certain RPM threshold has been reached, indicating that the vehicle is underway. The vehicle fuel authorization controller can receive a signal from a vehicle speed sensor that the vehicle is in motion. The vehicle fuel authorization controller can receive a signal from a telematics device in the vehicle that the vehicle's position has changed. The vehicle fuel authorization controller can receive a signal from the fuel vendor that fuel delivery is finished (in a particular useful embodiment, such a signal from the fuel vendor will confirm how much fuel was actually delivered, which may be different than an amount that was requested if there was a limit on an amount of fuel that would be authorized per transaction, or if the fuel pump shut off early because the tank become full). In embodiments where the fuel authorization program requires an IR data link between the vehicle and the fuel vendor, and the IR link is active during the entire fuel transaction, the vehicle fuel authorization controller can be programmed to take the subsequent fuel tank reading once the IR data link is terminated. In embodiments where the fuel authorization program requires an RF data link between the vehicle and the fuel vendor, and the RF link is active during the entire fuel transaction, the vehicle fuel authorization controller can be programmed to take the subsequent fuel tank reading once the RF data link is terminated.

In a decision block 357, the vehicle fuel authorization controller determines if the tank reads full. If so, the logic terminates. If the tank does not read full (and the requested amount of fuel should have been sufficient to fill the tank), then in a block 360a the vehicle fuel authorization controller automatically determines a calibration factor to apply to subsequent fuel tank readings to make them more accurate for future fuel transaction requests. The calibration factor can be applied in several manners. The calibration factor can be a percentage error (i.e., a difference between a percentage reported in the tank reading of block 350 and block 355; for example block 350 read 70% full and 30% of the tank volume was requested for fuel authorization, block 355 read 95% full, then the calibration factor is based on the 5% under filling). The calibration factor can also be expressed in terms of volume (gallons or liters).

Referring once again to block 357, in some embodiments, the vehicle fuel authorization controller may be programmed to automatically request less fuel than calculated to fill the vehicle's fuel tank. In such embodiments, rather than asking if the tank is full in block 357, the query is whether the subsequent measurement from the fuel tanks sensor is what would have been expected based on the prior measurement (block 350) and the amount of fuel requested. The calibration factor can then be based on any detected variance.

Similarly, in some embodiments the fuel vendor fuel authorization controller may be programmed to automatically deliver less than the requested amount of fuel (for example, there may be an upper limit of how much fuel can be delivered in a single transaction in the fuel authorization program). In such an embodiment, the fuel vendor fuel authorization controller will report to the vehicle fuel authorization controller how much fuel is actually dispensed (over an RF data link in most embodiments). In such embodiments, rather than asking if the tank is full in block 357, the query is whether the subsequent measurement from the fuel tanks sensor is what would have been expected based on the prior measurement (block 350) and the amount of fuel delivered as reported by the fuel vendor fuel authorization controller. The calibration factor can then be based on any detected variance.

FIG. 20 is a logic diagram showing exemplary method steps implemented in a fuel authorization program requiring fuel tank readings from enrolled vehicles for fuel authorization, where a monitoring service collects fuel tank sensor data from enrolled vehicles and fuel transaction data from fuel vendors to determine if the fuel tank sensor in an enrolled vehicle requires calibration.

Significantly, the method of FIG. 20 requires that the enrolled vehicle provide sensor tank data to the monitoring service during regular vehicle operation, and not just during fuel transactions. Particularly where an enrolled vehicle is equipped with the telematics device of FIG. 6 (or any other telematics device designed to collect vehicle data and use a satellite, cellular, or Wi-Fi connection to send data from the vehicle to a monitoring service), data will be regularly sent from the enrolled vehicle to the monitoring service, and the fuel tank sensor data can be included in such data transmissions. The monitoring service will then have available a rich history of fuel tank sensor data from each enrolled vehicle, and relatively accurate calibration settings can be automatically calculated at the remote monitoring service. When fuel transaction data from participating fuel vendors is also sent to the remote monitoring service, such data can also be used to calculate a calibration (note that the concepts disclosed herein further encompass embodiments where the remote monitoring service bases calibration factors only on data from vehicles and only on data from fuel vendors; noting that if only on data from fuel vendors, such data preferably includes vehicle sensor tank data including in a fuel authorization request and the amount of fuel actually dispensed).

In a block 362, a fuel authorization processor at the enrolled vehicle automatically sends fuel tank sensor data from the enrolled vehicle to a remote monitoring service during normal vehicle operation over a wireless data link (generally a relatively long range wireless data link, such as cellular or satellite, although Wi-Fi can be used if the vehicle operates in an area with dense Wi-Fi networks, or often is in range of Wi-Fi networks). In an exemplary embodiment such fuel tank reading are sent multiple times a day when the vehicle is operating. In some embodiments, such reporting occurs as often as every five minutes during vehicle operation, or more). This enables the monitoring service to accumulate a rich fuel tank reading data set (often in combination with fuel use related data, such as speed, engine RPM, and accumulated mileage).

In a block 364 each enrolled fuel vendor sends fuel transaction data regarding the enrolled vehicle to the remote monitoring service. In at least one embodiment, such data is sent over land lines, or an internet based connection.

In a block 366, the monitoring service automatically evaluates the data streams from the fuel vendor and enrolled vehicles and on a per vehicle basis, and determines if any calibration is required for any fuel tank sensor on any of the enrolled vehicles. If no calibration is required, the logic loops back to the monitoring step of block 366. If in a block 368 the monitoring service (i.e., a controller/processor automatically evaluating the data at the monitoring service) determines that calibration is required, then in a block 370 the monitoring service automatically communicates with the vehicle in question, sending to the vehicle fuel authorization controller in that vehicle the required calibration factor.

In a block 360b the vehicle fuel authorization controller automatically determines applies the calibration factor provided by the remote monitoring service to subsequent fuel tank readings to make them more accurate for future fuel transaction requests. The calibration factor can be applied in several manners, generally as discussed above.

With respect to the Reefer Fuel embodiment noted above, it should be understood that the concepts disclosed herein further encompass attaching tank sensors to the fuel tanks in a reefer trailer, and communicating the fuel tanks readings during a fuel transaction using for example, an RF data link between a reefer tag and a truck puck, generally as discussed above.

Certain of the method steps described above can be implemented automatically. It should therefore be understood that the concepts disclosed herein can also be implemented by a controller, and by an automated system for implementing the steps of the method discussed above. In such a system, the basic elements include an enrolled vehicle having components required to facilitate the authorization process, and a fuel vendor whose fuel lanes/fuel dispensers include components that are required to facilitate the authorization process as discussed above. It should be recognized that these basic elements can be combined in many different configurations to achieve the exemplary concepts discussed above. Thus, the details provided herein are intended to be exemplary, and not limiting on the scope of the concepts disclosed herein.

Non-Transitory Memory Medium

Many of the concepts disclosed herein are implemented using a processor that executes a sequence of logical steps using machine instructions stored on a physical or non-transitory memory medium. It should be understood that where the specification and claims of this document refer to a memory medium, that reference is intended to be directed to a non-transitory memory medium. Such sequences can also be implemented by physical logical electrical circuits specifically configured to implement those logical steps (such circuits encompass application specific integrated circuits). Where a method is disclosed, corresponding method steps that can be implemented a processor can be stored as machine instructions on a physical or non-transitory memory medium.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for administering a fuel authorization program, the method comprising the steps of:
   (a) automatically sending, by a vehicle fuel authorization processor at an enrolled vehicle using at least one of a vehicle radiofrequency (RF) transmitter and a vehicle directional infrared (IR) transmitter over at least one of an RF data link and an IR data link, a fuel authorization request to a vendor fuel authorization processor at a fuel vendor, by the vehicle fuel authorization processor automatically implementing the steps of:
      (i) obtaining a vehicle fuel tank reading from a fuel tank sensor at the vehicle
      (ii) determining an amount of fuel required to fill the vehicle fuel tank using the vehicle fuel tank reading
      (iii) retrieving vehicle fuel authorization credentials from a memory at the vehicle;
      (iv) communicating, over the at least one of an RF data link and an IR data link, the determined amount of fuel required to fill the vehicle fuel tank and the vehicle fuel authorization credentials to the vendor fuel authorization processor;
   (b) automatically analyzing, by the vendor fuel authorization processor, the vehicle fuel authorization credentials to determine that the vehicle is enrolled in the fuel authorization program and to determine that the vehicle is authorized to receive fuel;
   (c) after determining the vehicle is enrolled in the fuel authorization program and is authorized to receive fuel, automatically, by the vendor fuel authorization processor, enabling fuel delivery at a fuel pump the vehicle is proximate to in a quantity equal to the determined amount of fuel required to fill the vehicle fuel tank
   (d) automatically determining, by the vendor fuel authorization processor, that fuel delivery was terminated early at the fuel pump to prevent spillage;
   (e) in response to the determination that fuel delivery was terminated early to prevent spillage, automatically sending, by the vendor fuel authorization processor over at least one of an RF data link and an IR data link to the vehicle fuel authorization processor, a communication or indicating that less fuel was delivered than was requested, and including at least one of a percentage difference of the determined amount of fuel required to fill the vehicle fuel tank, a volumetric quantity of fuel actually delivered, or a volumetric quantity of fuel not actually delivered;
   (f) in response to receiving the communication from the fuel vendor authorization processor, automatically computing, by the vehicle fuel authorization processor, a calibration factor, the calibration factor being at least one of the received percentage difference expressed as a percentage, the received percentage difference expressed as a volumetric quantity, the volumetric quantity of fuel not actually delivered, the volumetric quantity of fuel not actually delivered expressed as a percentage of the determined amount of fuel required to fill the vehicle fuel tank, the difference between the determined amount of fuel required to fill the vehicle fuel tank and the volumetric quantity of fuel actually delivered expressed as a volumetric quantity; a percentage difference between the determined amount of fuel required to fill the vehicle fuel tank and the volumetric quantity of fuel actually delivered,
   (g) storing, by the vehicle fuel authorization processor, the calibration factor in a memory at the vehicle;
   (h) and to applying, by the vehicle fuel authorization processor, this calibration factor to subsequent fuel tank readings when subsequently determining amounts of fuel required to fill the vehicle fuel tank so that subsequent fuel authorization requests will be more accurate.

2. The method of claim 1, wherein the vehicle fuel authorization processor retrieves a predetermined correction factor from a memory and adds it to the computed calibration factor before storing it.

3. The method of claim 1, wherein the vehicle fuel authorization processor retrieves a predetermined correction factor from a memory and subtracts it from the computed calibration factor before storing it.

4. The method of claim 2, wherein the predetermined correction factor is provided as a proportion of fuel tank capacity.

5. The method of claim 2, wherein the predetermined correction factor is provided as an amount of fuel.

6. The method of claim 5, wherein the amount of fuel is provided in units of volume.

7. The method of claim 6, wherein the units of volume are gallons.

8. A fuel authorization system to be installed in a vehicle participating in a fuel authorization program, where the fuel authorization program is based on exchanging data between the vehicle and a fuel vendor via both infrared (IR) and radiofrequency (RF) communication, the fuel vendor having a station RF transmitter, a station RF receiver, a station IR receiver, and a fuel vendor processor connected to said station RF transmitter, station RF receiver, and station IR receiver, comprising:
   (a) a fuel tank sensor for measuring a quantity of fuel in the vehicle's fuel tank;
   (b) a vehicle RF transmitter and an RF receiver, the RF transmitter and an RF receiver for exchanging data between the vehicle and the fuel vendor processor over an RF data link formed between the vehicle RF transmitter and receiver and the station RF transmitter and receiver;

(c) a vehicle fuel authorization processor which, in response to receiving an RF query from the fuel vendor processor over the RF data link, automatically implements the functions of:
  (i) obtaining a vehicle fuel tank reading from the fuel tank sensor at the vehicle;
  (ii) establishing an RF data link between the vehicle RF transmitter and receiver and the station RF transmitter and receiver;
  (iii) retrieving vehicle fuel authorization credentials from a memory at the vehicle;
  (iv) communicating, to the fuel vendor processor over the RF data link, a fuel authorization request comprising the fuel tank reading and the vehicle fuel authorization credentials
  (v) receiving, from the fuel vendor processor over the RF data link, a communication indicating that less fuel was delivered than was requested and including the total amount of fuel delivered
  (vi) in response to receiving the communication from the fuel vendor processor automatically computing, by the vehicle fuel authorization processor, a calibration factor, the calibration factor being at least one of the difference between the total amount of fuel delivered and the fuel tank capacity minus the vehicle fuel tank reading expressed as a volumetric quantity, or the difference between the total amount of fuel delivered and the fuel tank capacity minus the vehicle fuel tank reading expressed as a percentage,
  (vii) storing, by the vehicle fuel authorization processor, the calibration factor in a memory at the vehicle;
  (viii) in response to receiving a subsequent RF query from a fuel vendor processor over an RF data link, automatically retrieving this calibration factor from a memory at the vehicle and applying this calibration factor to subsequent vehicle fuel tank readings so that subsequent fuel authorization requests will be more accurate.

9. The system of claim 8, wherein the vehicle fuel authorization processor retrieves a predetermined correction factor from a memory and subtracts it from the computed calibration factor before storing it.

10. The system of claim 8, wherein the vehicle fuel authorization processor retrieves a predetermined correction factor from a memory and adds it to the computed calibration factor before storing it.

11. The system of claim 9, wherein the predetermined correction factor is provided as a proportion of fuel tank capacity.

12. The system of claim 9, wherein the predetermined correction factor is provided as an amount of fuel.

13. The system of claim 12, wherein the amount of fuel is provided in units of volume.

14. The system of claim 13, wherein the units of volume are gallons.

* * * * *